United States Patent
Amou et al.

(10) Patent No.: US 6,820,864 B2
(45) Date of Patent: Nov. 23, 2004

(54) FUEL VAPORIZATION PROMOTING APPARATUS AND FUEL CARBURETION ACCELERATOR

(75) Inventors: Kiyoshi Amou, Chiyoda (JP); Yuzo Kadomukai, Ishioka (JP); Hiroaki Saeki, Hitachinaka (JP); Kenji Watanabe, Hitachi (JP); Takanobu Ichihara, Hitachinaka (JP); Masami Nagano, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/327,029

(22) Filed: Dec. 24, 2002

(65) Prior Publication Data

US 2003/0155666 A1 Aug. 21, 2003

(30) Foreign Application Priority Data

Jan. 15, 2002 (JP) ........................................ 2002-005458
Jan. 16, 2002 (JP) ........................................ 2002-006865

(51) Int. Cl.$^7$ ............................................. F02M 29/06
(52) U.S. Cl. ..................... 261/78.1; 123/549; 261/79.1; 261/112.1; 261/153; 261/156; 261/DIG. 25; 261/DIG. 55; 261/DIG. 83
(58) Field of Search ................................ 261/153, 156, 261/112.1, 79.1, 78.1, DIG. 25, DIG. 55, DIG. 83; 123/549

(56) References Cited

U.S. PATENT DOCUMENTS

| | | | |
|---|---|---|---|
| 600,298 A | * 3/1898 | Tackle ......................... | 261/153 |
| 703,995 A | * 7/1902 | Caton et al. ................ | 261/153 |
| 898,935 A | * 9/1908 | Sladek et al. ............... | 261/153 |
| 909,896 A | * 1/1909 | Hertzberg et al. .......... | 261/144 |
| 921,934 A | * 5/1909 | Willard ........................ | 48/107 |
| 1,308,595 A | * 7/1919 | Kidder ....................... | 261/50.2 |
| 1,777,472 A | * 10/1930 | Mock et al. ................ | 261/128 |
| 2,925,257 A | * 2/1960 | Cohn ......................... | 261/145 |
| 5,482,023 A | 1/1996 | Hunt et al. ................. | 123/491 |
| 5,894,832 A | 4/1999 | Nogi et al. ................. | 123/491 |
| 5,919,406 A | * 7/1999 | Bachofen .................... | 261/153 |
| 6,508,236 B2 | * 1/2003 | Amou et al. ................ | 123/545 |
| 6,536,748 B1 | * 3/2003 | Tachihara et al. .......... | 261/79.2 |
| 6,543,412 B2 | * 4/2003 | Amou et al. ................ | 123/337 |

* cited by examiner

*Primary Examiner*—Richard L. Chiesa
(74) *Attorney, Agent, or Firm*—Antonelli, Terry, Stout & Kraus, LLP

(57) ABSTRACT

Atomization and vaporization of spray in a fuel supply system is promoted at the time of cold startup and the amount of fuel depositing on the inner wall of the intake manifold is reduced, thereby ensuring improved startability of an internal combustion engine of a car, reduced fuel costs and improved purification of exhaust gas. A very fine groove is formed on a heat transfer surface in a fuel vaporization promoting apparatus, wherein this groove is shaped in such a way that fuel is dispersed by the surface tension of the heat transfer surface and the fuel. This configuration ensures uniform dispersion of fuel on the heat transfer surface and effective promotion of vaporization.

7 Claims, 26 Drawing Sheets

VIEW TAKEN IN THE
DIRECTION OF ARROW A

VIEW TAKEN IN THE
DIRECTION OF ARROW B

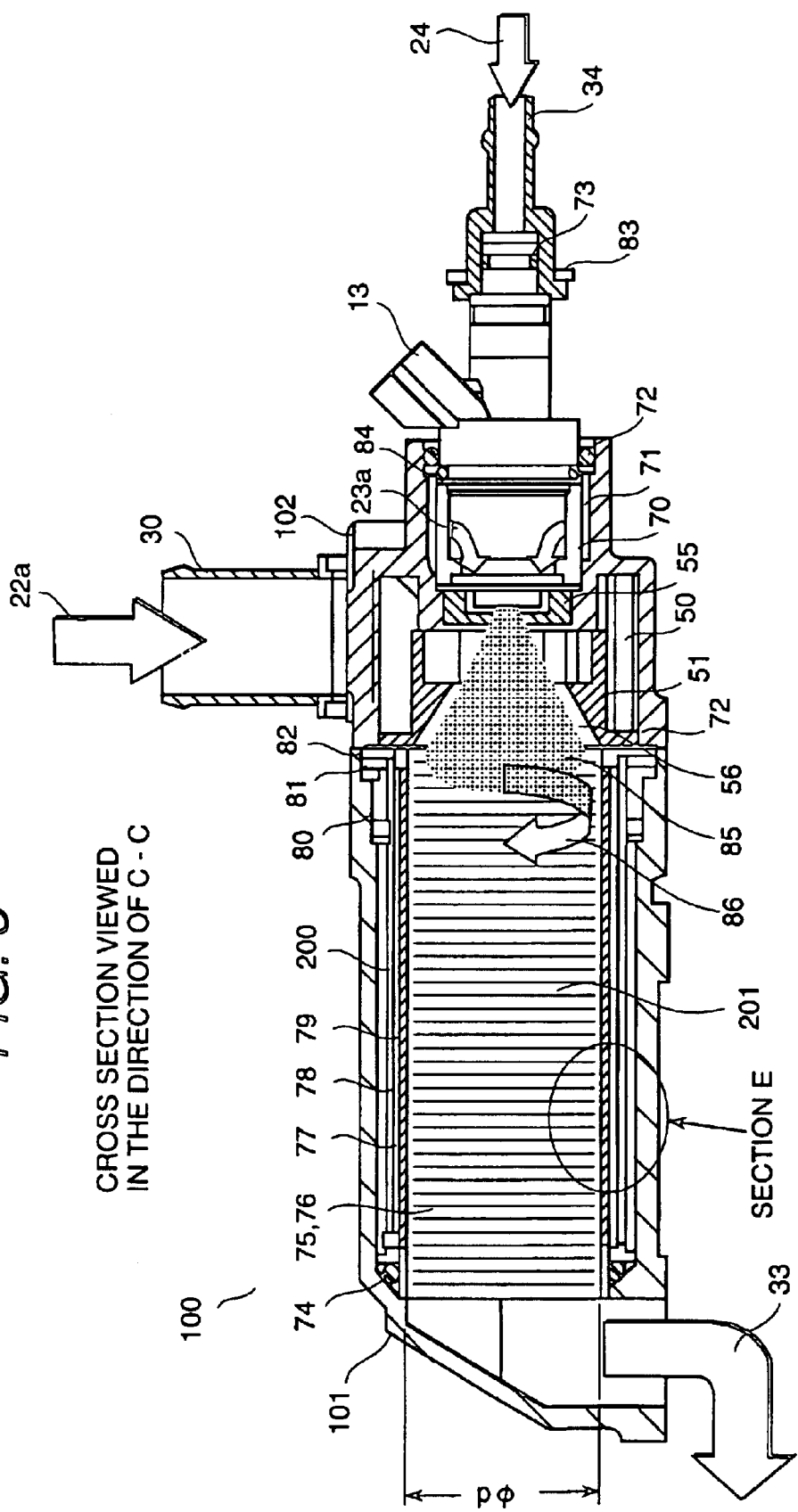

CROSS SECTION VIEWED IN THE DIRECTION OF D - D

ENLARGED VIEW OF SECTION E

ENLARGED VIEW OF SECTION F

① UNIFORM DISPERSION OF LIQUID FILM
+
② REDUCE THICKNESS OF LIQUID FILM
+
③ EXPANDED HEAT TRANSFER AREA

⇩

PROMOTION OF VAPORIZATION HEAT $$a = \frac{d}{2 \cdot \cos\left(\frac{\theta}{2} + \theta_0\right)} \quad \cdots\cdots\cdots\text{(EQUATION 1)}$$

$$h = \frac{\sigma}{\rho \cdot g} \cdot \frac{L_s}{S} \quad \cdots\cdots\cdots\text{(EQUATION 2)}$$

① UNIFORM DISPERSION OF LIQUID FILM
+
② REDUCE THICKNESS OF LIQUID FILM
+
③ EXPANDED HEAT TRANSFER AREA

⇩

PROMOTION OF VAPORIZATION HEAT

CROSS SECTION A - A

CROSS SECTION A - A

CROSS SECTION A - A

CROSS SECTION A - A

CROSS SECTION A - A

CROSS SECTION A - A

FUEL VAPORIZATION PROMOTING APPARATUS AND FUEL CARBURETION ACCELERATOR

BACKGROUND OF THE INVENTION

The present invention relates to a fuel supply technique for ensuring excellent combustion of fuel in the internal combustion engine of an automobile.

The present invention relates to a fuel carburetion accelerator for accelerating the carburetion of fuel supplied to an automobile internal combustion engine, which fuel carburetion accelerator can be applied to both the type of combustion engine in which fuel is injected to the air suction ports of each cylinder, and the type of combustion engine in which fuel is injected directly to each cylinder.

To improve the startability of an internal combustion engine, reduce the fuel costs, to purify the exhaust gas and reduce HC gas in purification of the exhaust gas, it is effective to reduce the deposition of fuel on the inner wall surface of an intake manifold by atomizing and vaporizing the fuel spray injected by a fuel injection valve (injector). Further, fuel stabilization is provided by feeding fuel after the atomization and vaporization thereof.

One known way of feeding atomized and vaporized fuel is by installing a fuel injection valve (injector) for use on a supplementary basis mainly when starting the internal combustion engine.

U.S. Pat. No. 5,894,832 discloses a cold start fuel control system comprising a cold start fuel injector, a heater, and an idle speed control valve (hereinafter referred to as an "ISC valve"). In this system, a swirl is applied to the fuel spray injected by a fuel injection valve that is arranged on the downstream side of the ISC valve of the internal combustion engine so as to be introduced downstream of the air sucked through the ISC valve, thereby promoting a mixing between them. At the same time, the gas mixture for which mixing is promoted is caused to impact against a heater installed on the downstream side of the fuel injection valve, so that the gas mixture is heated and vaporized, thereby reducing the amount of fuel deposited on the inner surface of the intake manifold.

In the above-described system, fuel spray is made to impact on a heater arranged on the downstream side of the fuel injection valve, and vaporization of the fuel spray is promoted by the heat generated by this heater. However, this method is not always sufficient for improvement of fuel spray vaporization.

Such a known type of fuel carburetion accelerator is described in U.S. Pat. No. 5,482,023. This fuel control system has a fuel injection valve, heaters, and an idle speed control valve (ISC valve). For this system, a portion of the air from the ISC valve (namely, a first air current) is mixed with the fuel injected from the fuel injection valve. For this purpose, the hole in the air channel from the ISC valve is provided cyclically around the outlet portion of the fuel injection valve. Immediately after the fuel from the fuel injection valve and the first air current have been mixed, this mixture is fed into an array of cylindrical heaters located downstream at the fuel injection valve. An air channel through which a portion of the air from the ISC valve is to flow is formed on the inner surface of each heater; and, at the outlet of the heater, the air that flows in through this air channel (namely, the second air current) is mixed with the injected fuel that flows in through the inside of the heater. The carburetion of the fuel which has been injected from the fuel injection valve is accelerated during passage through the heater, and, then the carburetion of the fuel is further accelerated when mixed with the second air current at the outlet of the heater.

The conventional system described above has a structure in which the fuel injection valve, the confluent point between the fuel from the fuel injection valve and the first air current, and the mixing chamber provided inside the heaters to mix the fuel and the second air current, are arranged in that order from the upstream side in sequence, and the carburized fuel is directly introduced from the heater outlet into the main air channel.

For a conventional system of such structure, the flow of air along the inner wall surface of the heater becomes nonuniform, and, when the fuel comes into contact with the inner wall surface of the heater, the liquid film tends to become thick in some places and thin in some places. This phenomenon induces the possibility of the fuel being introduced into the main channel without being completely carburized. And this, in turn, poses the problem that, since complete carburetion requires a heater that is greater in capacity, length, and diameter, the power consumption also increases.

SUMMARY OF THE INVENTION

One object of the present invention is to improve the efficiency of vaporizing the fuel spray by use of a heater.

To attain the above-stated object, the present invention provides liquid film forming means for converting, into a thin film, the fuel sprayed to the surface of a transfer unit by a fuel injection valve. This means produces a thin layer of liquid fuel film and permits uniform dispersion of fuel, thereby improving the vaporization efficiency.

In this case, the heat transfer surface is formed to have an irregular shape, so that the heat transfer area can be expanded. This allows the heater to be downsized and installed on the throttle body and intake manifold. This also ensures easy installation of it on the engine.

In addition to the above-described means, causing air to act on the fuel spray injected from the fuel injection valve ensures effective atomization of the fuel spray and a smooth feeding of fuel in the downstream direction, and it allows fuel spray to hit the surface of the heat transfer unit uniformly, thereby ensuring formation of a thinner liquid fuel film and a more uniform distribution of the fuel.

Another object of the present invention is to ensure that the fuel comes into the inner wall surface of the heater as uniformly as possible.

A further object of the present invention is to obtain a motor-driven throttle valve equipped with a fuel carburetion accelerator which can be engine-installed with a minimum installation space.

A further object of the present invention is to obtain an air/fuel feeder that can control the flow rates of both air and a carburized fuel.

A further object of the present invention is to obtain a fuel carburetion accelerator that enables at least a portion of its body to be used as an electrode as well.

A further object of the present invention is to ensure more efficient carburetion of the supplied air-fuel mixture inside the cylindrical heater.

A further object of the present invention is to suppress the vaporization of the fuel at the fuel injection valve portion of the fuel carburetion accelerator.

In order to attain at least one of the above-stated objects, the present invention is embodied in the following configurations:

A fuel carburetion accelerator has a fuel injection element for injecting a fuel, a cylindrical inner-walled heater element combined with the fuel injection element to carburize the fuel injected therefrom, a swirling air current supply element installed between the fuel injection element and the heater element to supply a swirling air current from the periphery of the fuel injected from the fuel injection element to the cylindrical inner wall surface of the heater element, and an enclosure that holds the fuel injection element, heater element, and swirling air current supply element. The swirling air current supply element is further equipped with a plurality of blade members for introducing an air current in their radial direction from outside towards the inside and for generating a swirling flow of air around the injected fuel.

A fuel carburetion accelerator has a heater element having a cylindrical inner wall surface for guiding an air-fuel mixture, a swirling air current supply element installed at the end of one side of the heater element to induce a swirling air current along the cylindrical inner wall surface, and a fuel injection element for injecting fuel to the heater element.

A fuel carburetion accelerator has an air guide that has an air inlet port on its outer surface, an air outlet port in its center portion, and an air guide wall provided between the air inlet port and the air outlet port so that air flows from the periphery of the air guide towards the center, a cylindrical heater element having a hole for receiving air from the air guide, and a fuel injection element for injecting fuel to the cylindrical heater element.

A fuel carburetion accelerator has a housing, at one side of which is installed a fuel injection valve and at the other side of which is installed a heater having a cylindrical portion for receiving fuel from the fuel injection valve, an air inlet port provided in the housing to take in air from the outer surface of the housing, a guide wall provided to apply a swirling force to the air taken in from the air inlet port, and an air outlet port formed to supply the heater with the air to which the swirling force has been applied by the guide wall.

A fuel carburetion accelerator has a housing provided with a guide wall to apply a swirling force to air introduced from an air inlet port, a cylindrical heater having a hole for receiving an air current created by the applied swirling force, and a fuel injection valve for supplying fuel to the air current.

A fuel carburetion accelerator is characterized in that one end of the accelerator has an open end upstream at a throttle valve which controls the amount of air to be supplied to a cylinder, and the other end of the accelerator is provided with another air channel connected to a cylindrical heater via an air swirling element, in that the outlet of the heater is connected to an air channel provided downstream at the throttle valve, and in that a fuel injection valve is provided for supplying fuel to the heater.

A motor-driven throttle valve unit is equipped with a fuel carburetion accelerator, characterized in that a fuel injection valve is mounted on an air suction channel enclosure having a motor for a motor-driven throttle valve provided to electrically control the amount of air to be supplied to a cylinder, in that a heater unit for carburizing the fuel injected from the fuel injection port of the fuel injection valve is installed on the air suction channel enclosure, in that the heater unit is equipped with an air inlet port for introducing air from the upstream side of the throttle valve, and with an air-fuel mixture supply port for supplying air and fuel to the air suction channel located downstream at the throttle valve, and in that the air suction channel enclosure has a hole in communication with the air-fuel mixture supply port of the heater unit.

A motor-driven throttle valve unit equipped with a fuel carburetion accelerator is characterized in that a fuel injection valve is mounted on an air suction channel enclosure having a motor for a motor-driven throttle valve provided to electrically control the amount of air to be supplied to a cylinder, in that a heater unit for carburizing the fuel injected from the fuel injection port of the fuel injection valve is installed on the air suction channel enclosure, in that the heater unit is equipped with an air inlet port for introducing air from the upstream side of the throttle valve, and with an air-fuel mixture supply port for supplying air and fuel to the air suction channel located downstream at the throttle valve, and in that the air suction channel enclosure has a hole in communication with the air-fuel mixture supply port of the heater unit.

An air/fuel feeder has a fuel carburetion accelerator equipped with a cylindrical heater unit for carburizing the fuel injected from the fuel injection port of a fuel injection valve, and a motor-driven throttle valve unit for electrically controlling the amount of air to be supplied to a cylinder. The air/fuel feeder is characterized in that the cylindrical heater unit and the motor are arranged so that the central axial line of the heater unit is orthogonal to the rotational axis of the motor, in that the heater unit is equipped with an air inlet port for introducing air from the upstream side of said throttle valve, and with an air-fuel mixture supply port for supplying air and an fuel to the air suction channel located downstream at the throttle valve, and in that the air/fuel feeder itself has a hole which forms the air-fuel mixture supply port of the heater unit.

An air/fuel feeder has a fuel carburetion accelerator equipped with a cylindrical heater unit for carburizing the fuel injected from the fuel injection port of a fuel injection valve, and a motor-driven throttle valve unit for electrically controlling the amount of air to be supplied to a cylinder. The air/fuel feeder is characterized in that the cylindrical heater unit and the motor are arranged so that the central axial line of the heater unit is orthogonal to the rotational axis of the motor, in that the heater unit is equipped with an air inlet port for introducing air from the upstream side of the throttle valve, and with an air-fuel mixture supply port for supplying air and fuel to the air suction channel located downstream at the throttle valve, and in that the air/fuel feeder itself has a hole which forms the air-fuel mixture supply port of the heater unit.

A fuel carburetion accelerator has an air injection valve that injects fuel to the air suction ports of each cylinder, a separate air injection valve connected to a fuel pipeline together with an air injection valve which injects fuel directly to the inside of each cylinder, and a carburizing element for carburizing the fuel injected from air injection valve. The fuel carburetion accelerator is characterized in that at least the fuel pipeline leading to the separate air injection valve adopts a return-type connection scheme.

A fuel carburetion accelerator has a cylindrical heater unit equipped with an inlet port from which a mixture of air and fuel injected from a fuel injection valve is to be taken in, and a portion for heating an air-fuel mixture on the inner wall surface of said cylindrical heater unit, then carburizing the mixture, and discharging the carburized mixture from the outlet hole in the heater unit. The fuel carburetion accelerator is characterized in that a stepped portion is formed towards the inside of the mixture outlet portion of the heater.

More specifically, the following configurations are adopted.

A fuel carburetion accelerator for an internal combustion engine has a first fuel injection valve inside each of its multiple cylinders, and it is constricted in such a manner that a hole is formed halfway in the air suction channel located downstream at the throttle valve of the internal combustion engine, and that a sub-channel having an air inlet port formed at the upstream side of the throttle valve functions as a bypass for the main air suction channel, with the sub-channel having its outlet portion being connected to the air suction channel through a deflecting channel. The fuel carburetion accelerator is characterized in that: it is constructed so that a heater section having a heater which generates heat when powered from outside is provided on the outer surface of the sub-channel, and so that fuel is injected from a second fuel injection valve provided in coaxial relationship with respect to the sub-channel and at the upstream side of the heater section, towards this heater section, in the same direction as that of the flow of air. A mixing chamber is provided at the injection hole portion of the second fuel injection valve; a plurality of air channels formed at equal intervals so as to deviate tangentially from the central axis of the sub-channel are arranged on the outer surface of the mixing chamber: a spiral air introduction channel is positioned along the outer surfaces of the plurality of air channels; and, the spiral air introduction channel is constructed so that the channel area increases at the air inlet side and then decreases progressively.

A fuel carburetion accelerator for an internal combustion engine has a first fuel injection valve inside each of its multiple cylinders, and it is constructed in such a manner that a hole is formed halfway in the air suction channel located downstream at the throttle valve of the internal combustion engine and that a sub-channel having an air inlet port formed at the upstream side of the throttle valve functions as a bypass for the main air suction channel. The fuel carburetion accelerator is characterized in that: it is constructed so that a heater section having a heater which generates heat when powered from outside is provided on the outer surface of the sub-channel and so that a mixing chamber is provided at the upstream side of the heater section. A bypass air channel formed at the upstream side of the throttle valve is positioned in coaxial form with respect to the central axis of the heater section; a second fuel injection valve is provided at a position offset from the central axis of the sub-channel; an inclined plate is provided at the immediate rear of the injection port of the second fuel injection valve to deflect the injected fuel and introduce this fuel into the mixing chamber; and, a plurality of air channels formed at equal intervals so as to deviate tangentially from the central axis of the sub-channel are arranged on the outer surface of the mixing chamber.

A fuel carburetion accelerator for an internal combustion engine has a first fuel injection valve inside each of its multiple cylinders, and it is constructed in such a manner that a hole is formed halfway in the air suction channel located downstream at the throttle valve of the internal combustion engine and that a sub-channel having an air inlet port formed at the upstream side of the throttle valve functions as a bypass for the main air suction channel, with the sub-channel having its outlet portion connected to the air suction channel through a deflecting channel. The fuel carburetion accelerator is characterized in that: it is constructed so that a heater section having a heater which generates heat when powered from outside is provided on the outer surface of the sub-channel and so that fuel is injected from a second fuel injection valve provided in coaxial relationship with respect to the sub-channel and downstream at the heater section, towards the mixing chamber at the upstream side of the heater section, in the opposite direction so as to collide with the flow of air. A plurality of air channels formed at equal intervals so as to deviate tangentially from the central axis of the sub-channel are arranged on the outer surface of the mixing chamber; a spiral air introduction channel is positioned along the outer surfaces of the plurality of air channels; and the spiral air introduction channel is constructed so that the channel area increases at the air inlet side and then decreases progressively.

A fuel carburetion accelerator has an air swirling element for receiving air from an air channel provided at the upstream side of a throttle valve which controls the amount of air to be supplied to a cylinder, a cylindrical heater unit for acquiring the air to which swirling force has been applied by the air swirling element, and a fuel injection valve for supplying fuel to said cylindrical heater unit. The fuel carburetion accelerator is characterized in that the air-fuel mixture outlet hole in the cylindrical heater unit is connected to a surge tank provided downstream of the throttle valve.

BRIEF DESCRIPTION OF DRAWINGS

FIG. 2(*b*) is a view taken in the direction of arrow A in FIG. 2(*a*);

FIG. 2(*c*) is a view taken in the direction of arrow B in FIG. 2(*a*);

FIG. 3 is a cross-sectional view of a fuel vaporization promoting apparatus taken along line C—C in FIG. 2(*b*).

FIG. 10(*b*) is a diagram of a groove in which the swirl flow direction is substantially the same as the groove formation direction;

FIG. 10(*c*) is a diagram of a groove in which the swirl flow direction differs from the groove formation direction;

DESCRIPTION OF THE INVENTION

An embodiment of the present invention will be described with reference to FIGS. 1 to 8.

Figure 1:
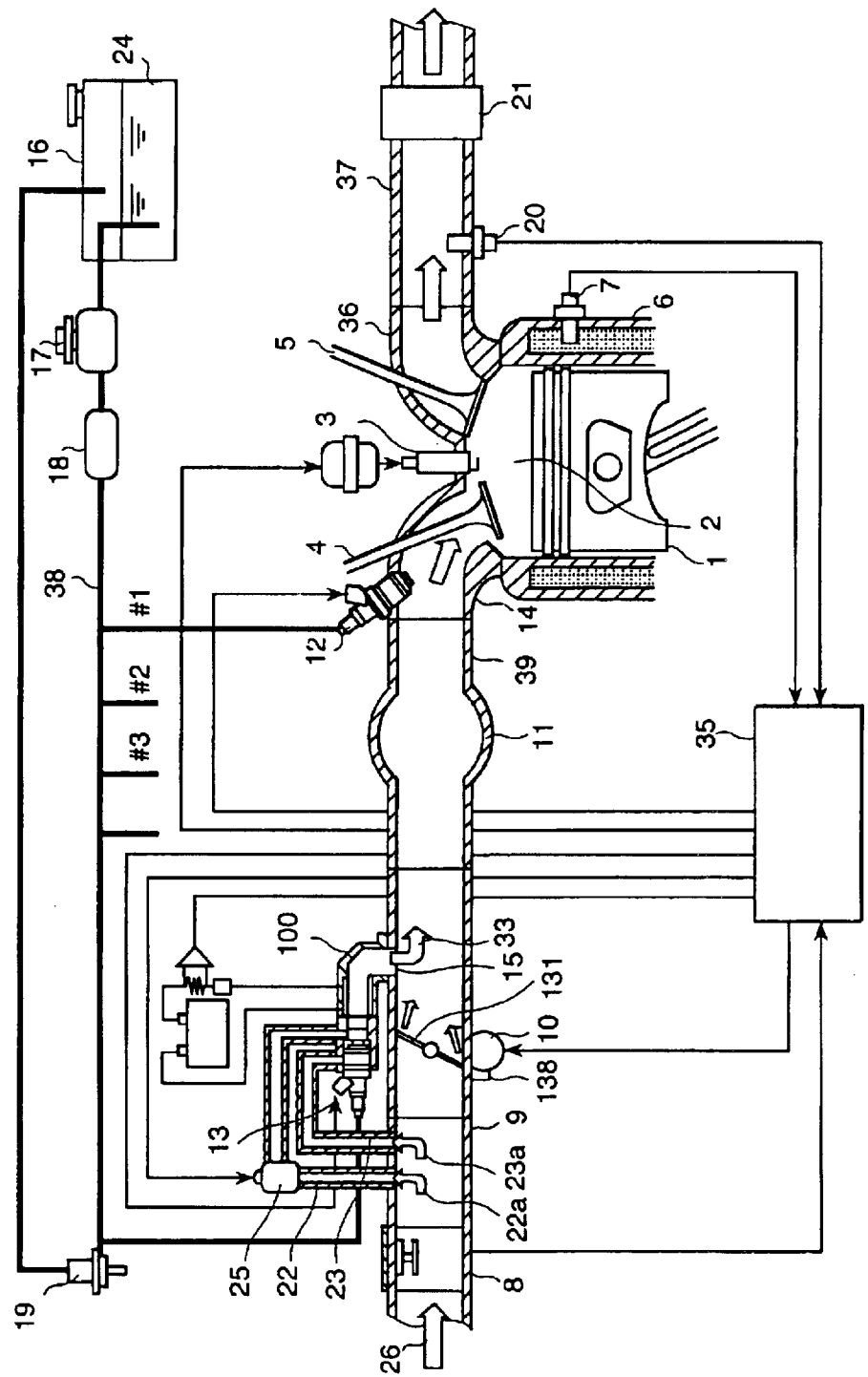
FIG. 1 is a schematic diagram representing the configuration of an internal combustion engine provided with a fuel vaporization promoting apparatus representing one embodiment of the present invention.

FIG. 1 is a schematic diagram representing an internal combustion engine 1, which is a known ignition type internal combustion engine using gasoline as a fuel. In this figure, only one cylinder of the plural cylinders of the engine is illustrated.

The internal combustion engine 1 has an ignition plug 3 arranged in a combustion chamber 2, which has an intake valve 4 for the intake of air mixed with fuel, and an exhaust valve 5 for discharging exhaust gas after combustion. The internal combustion engine 1 comprises a water temperature sensor 7 for detecting the temperature of engine coolant 6, and a rotary sensor (not illustrated) for detecting engine speed, and these sensors are used to detect operating conditions.

The intake system for supplying the gas that is sucked into the combustion chamber 2 comprises an air flow sensor 8 for measuring the air 26 passing through an air cleaner (not illustrated); an electronically controlled valve 10 for electrical control of the amount of air being supplied, which valve is mounted on a rotary shaft and is rotated synchronously so as to be opened and closed with the operation of the accelerator controlled by a driver or the operating condition of the internal combustion engine; a throttle positioning sensor 138; an intake collecting pipe 11; an intake manifold 39 that branches off into each cylinder of the internal combustion engine from the intake collection pipe 11; and a suction port in which the intake valve 4 is installed.

Information concerning the flow rate of intake air measured by the air flow sensor 8 and the throttle positioning sensor 138, and the opening of the valve unit 131 of throttle valve 10 is supplied to a controller 35 and is used for detection of the operating condition of the internal combustion engine 1 and for various controls.

The fuel injection valve system comprises a first fuel injection valve 12 and a second fuel injection valve 13. The first fuel injection valve 12 is mounted on an intake port 14 in such a way that fuel Is injected toward the intake valve 4 of each cylinder on the downstream side of the intake collecting pipe.

The second fuel injection valve is mounted on the fuel vaporization promoting apparatus 100 in such a way that fuel is supplied to the intake collecting pipe 11 from a branching passage 15 that opens on the downstream side of the electronically controlled throttle valve 10.

The fuel system comprises a tank 16 for storing fuel 24; a fuel pump 17 for pumping fuel 24 from fuel tank 16; a fuel filter 18; a pressure regulator 19 for regulating the pressure of pumped fuel 24 to a predetermined pressure; the first fuel injection valve 12 for injection of fuel to the intake port 14 of each cylinder (#1, #2, ... ); and the second fuel injection valve 13 for supply of fuel to the downstream side of throttle valve 131.

The exhaust gas system comprises an exhaust gas port equipped with an exhaust valve of each cylinder; an exhaust manifold 37; an oxygen concentration sensor 20 for measuring the oxygen concentration in the exhaust gas; a three-way component catalyst converter 21 for purifying the exhaust gas; and a muffler (not illustrated). The three-way component catalyst converter 21 provides a simultaneous purification of NOx, CO, and HC that is discharged from the internal combustion engine to a high purification rate.

The fuel vaporization promoting apparatus 100 is connected to a branched passage 15 that exits on the downstream side of the electronically controlled throttle valve 10. To lead air weighed by the air flow sensor to the fuel vaporization promoting apparatus 100, bypass passages 22 and 23, that branch off from the intake manifold 9, are formed so that the fuel bypasses from the upstream side of the electronically controlled throttle valve to the downstream side thereof. The bypass passage 22 is an air passage for feeding fuel 24 that is injected from the second fuel injection valve 13 through the branched passage 15. The amount of air flowing in the bypass passage 22 is adjusted by a flow control valve 25 arranged in the bypass passage 22. The bypass passage 23 is an air assist passage that is used to atomize the fuel 24 injected from the second fuel injection valve 13.

In the above-stated configuration, a mixture of the fuel 24 injected by fuel injection valves 12 and 13 and of the sucked air 26 is sucked into the combustion chamber 2. The sucked gas mixture is compressed, ignited by an ignition plug 3 and is subjected to combustion. Exhaust gas 42 discharged from the internal combustion engine 1 is released into the atmosphere from the exhaust system.

Figure 2A:
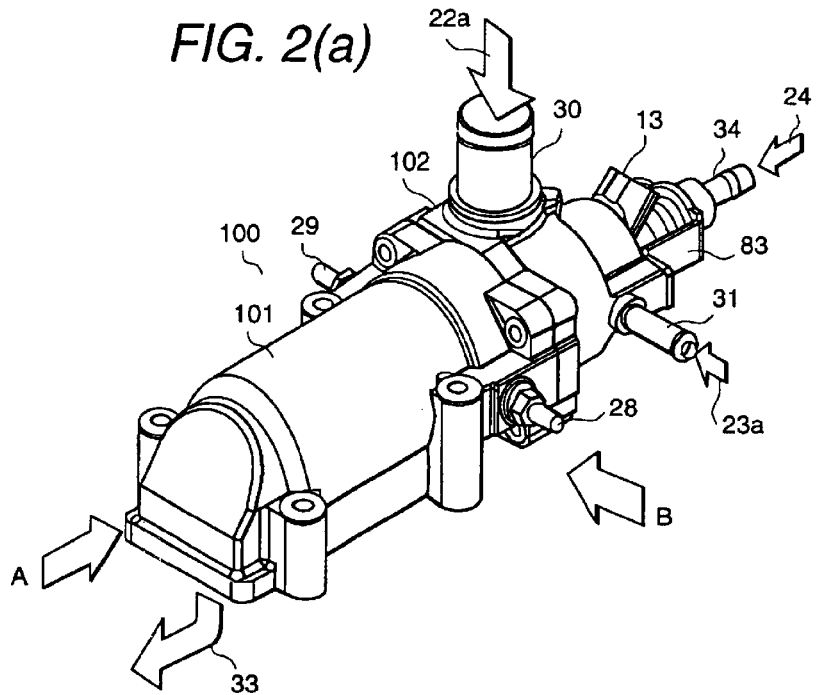
FIG. 2(*a*) is a perspective view representing a fuel vaporization promoting apparatus of the type shown in FIG. 1 according to the present invention.

The configuration of the fuel vaporization promoting apparatus 100 will be described in more detail with reference to FIGS. 2 to 5:

FIG. 2(a) is a perspective view showing the external appearance of the fuel vaporization promoting apparatus 100. The fuel vaporization promoting apparatus 100 comprises a body 102 and heater body 101. The body 102 is equipped mainly with a second fuel injection valve 13, air feed pipe 30 and atomizing air feed pipe 31. The bypass passage 22 passes through the air feed pipe 30, and feed air 22a is supplied therein. A bypass passage 23 passes through the atomizing air feed pipe 31, and atomizing air 23a flows therein. Fuel is pumped to the fuel injection valve 13 by a fuel pump 17 from the fuel tank 16, and fuel 24 is supplied through the fuel pipe 34.

A heater (to be described later) is built in the heater body 101, and electrode terminals 28 and 29 of positive and negative polarity, respectively, are provided for application of power to the heater. Fuel 24 vaporized in the heater body 101 is discharged out of the fuel vaporization promoting apparatus 100 as vaporized fuel 33, as indicated by the arrow.

Figure 2B:
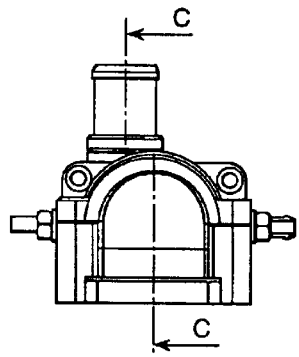
Figure 2C:
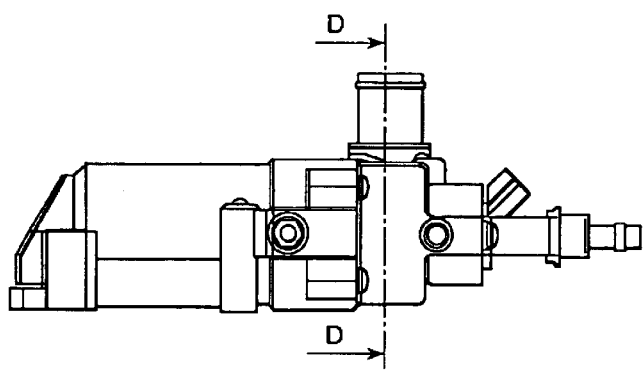
Figure 4:
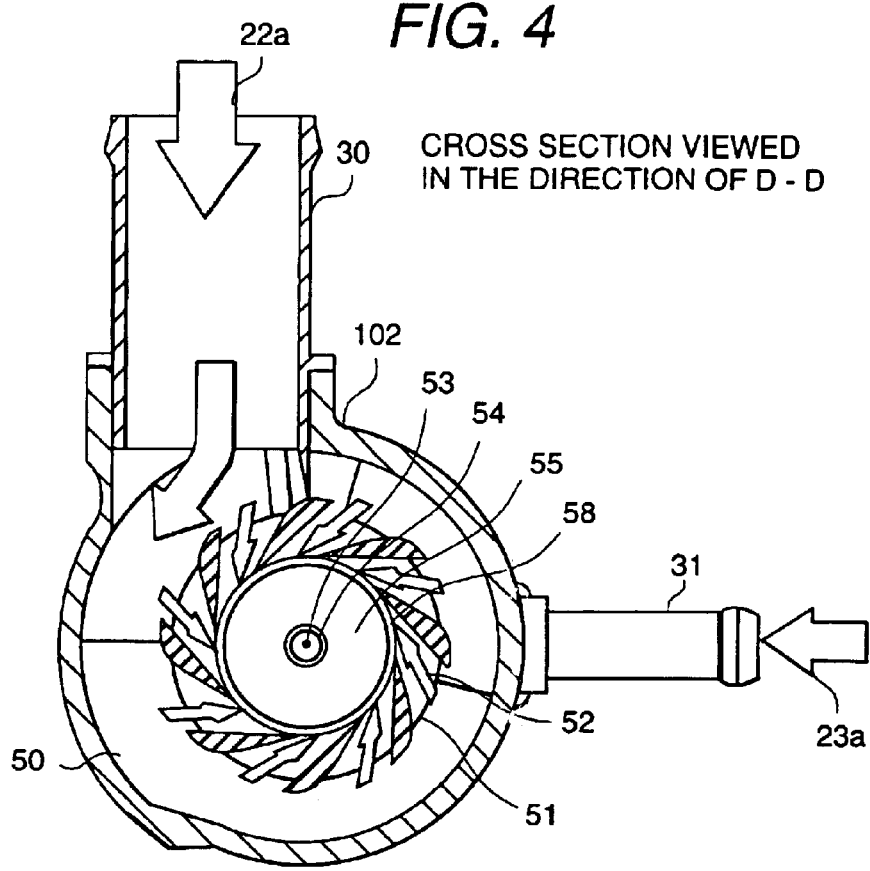
FIG. 4 is a cross-sectional view of a fuel vaporization promoting apparatus taken along line D—D in FIG. 2(*c*).

FIGS. 2(b) and 2(c) are the views taken in the directions of arrows A and B in FIG. 2(a). FIG. 3 is a cross section taken along line CC in FIG. 2(b). FIG. 4 is a cross section taken along line D—D in FIG. 2(c).

The sub-passage 75 that is formed inside the heater body 101 and has a deflection angle of α is mounted in the branched passage 15 that opens on the downstream side of the electronically controlled throttle valve 10, and a plate-shaped heater 77 is arranged on the outer periphery of the sub-passage 75, this heater (ceramic heater) having upper and lower surfaces serving as electrodes. Heat is generated when current is applied to the upper and lower electrodes. Further, a PTC (Positive Temperature Coefficient Thermistor) heater is used as this heater, which is configured in such a way that, when the temperature of the heater as a heat generating body has exceeded a predetermined value, the current resistance is increased and the temperature is maintained at a constant level.

The PTC heater 77 is fixed in such a way as to contact the sub-passage 75, which serves as a negative electrode, and a positive electrode 79. The positive electrode 79, which is held in place by an elastic member 78, is connected to the positive electrode terminal 28 that is arranged outside the heater body 101, through an electrode 80. The conductive sub-passage 75 is press-fitted with the electrode 82, which is connected to the negative electrode terminal 29 outside the heater body 101. The electrodes 82 and 80 are insulated by means of an insulating member 81 and an elastic member 78. When current is applied to the electrodes 82 and 80, the PTC heater 77 will generate heat to heat the sub-passage 75.

The sub-passage 75 is sealed from the internal passage by an O-ring 74 and gasket 72. The gasket 72 is compressed and sealed in such a way that it is sandwiched between the heater body 101 and the body 102.

The body 102 comprises a second fuel injection valve 13 that is arranged coaxially with the heater body 101. It is positioned by an air atomizer 55, O-ring 84 and O-ring 72 so as to seal the internal passage to the body 102, and it is fixed to the body 102 by means of a fuel pipe 34 and fuel pipe holder 83. The fuel passage has an O-ring 73 inserted between the fuel pipe 34 and fuel injection valve 13, and it is sealed.

In the embodiment of the present invention, there is a difference between the pressure on the upstream side of the valve 131 of the electronic throttle valve 10 and that on the downstream side thereof. So, when the valve 131 of the electronically controlled throttle valve 10 is closed, air flows into air passages 22 and 23, whereby the electronically controlled throttle valve 10 is bypassed. The fuel vaporization promoting apparatus 100 is arranged in this bypass passage, and atomizing air 23a is swirled by an atomizer 55 so as to hit the fuel spray 85 that is injected from the fuel injection valve 13 of fuel vaporization promoting apparatus 100. Thus, fuel 24 is atomized and is injected into a mixing chamber 56 with the spray angle expanded.

Injected fuel 24 and the feed air 22a, that is bypassed in the bypass passage 22 from the air feed pipe 30, are mixed and swirled by a swirl nozzle 51, where the air impacts with the fuel spray. Thus, the fuel is swirled and is made to deposit on the heat transfer surface 76 inside the sub-passage 75. When it passes over the heat transfer surface 76, fuel spray 85 is atomized.

Thus, the fuel spray 85 that is injected from the fuel injection valve 13 is swirled by the feed air 22a passing through the swirl nozzle 51 after atomization has been promoted by the atomizing air 23a. This promotes atomization of the spray 85, with the result that spraying at a wider angle is carried out.

The heat transfer surface 76 is provided with a very small groove 201 formed in the direction of the axial flow of the sub-passage 75. Spray is fed to the groove 201 formed on the heat transfer surface 76 of the internal wall of the sub-passage 75. Fuel spray 85 supplied to the groove 201 is dispersed in the heat transfer surface 76 by the profile of the groove 201 and the surface tension of the fuel. This groove 201 allows the fuel spray 85 to disperse more uniformly on the heat transfer surface. Further, the heat transfer area is also increased by formation of the groove 201. This makes it possible to reduce the thickness of the liquid fuel film formed on the heat transfer surface and promotes vaporization with high efficiency.

It is also possible to form this groove 201 as a spiral groove, wherein a groove progressing in the direction of axial flow of the sub-passage 75 is continuously formed in such a way as to run in the direction of flow of air passing through the heat transfer unit. When multiple independent grooves are formed in the direction of axial flow, the fuel spray can be retained in each groove to carry out vaporization. This advantage can be expected. Further, in the case of a spiral groove, expansion in a wider range in the direction of axial flow can be ensured.

The cross-section of the mixing chamber will be described with reference to FIG. 4. The mixing chamber is configured in such a way that feed air 22a, that is bypassed via the bypass passage 22, is supplied through one side of a pressure regulating chamber 50. The chamber 50 has a blade section profile with a wide cross sectional area on the inlet side and small area on the outlet side. Extending from the axial center, multiple swirl nozzles 51 are arranged at an equally spaced interval in the circumferential direction. The swirl nozzles 51 are opened in the flow direction of the bypass feed air 22a. To ensure that the flow rate of feed air 52 passing through each swirl nozzle 51 is constant, it is shaped in the form of a swirl, such that the space is smaller in the portion further downstream of the sectional area in the pressure regulating chamber 50. The swirl is formed so that the outer diameter of the pressure regulating chamber 50 is constant and the height is gradually increased in the axial direction. This allows a swirl structure to be adopted in a limited space and ensures a uniform feed air 52 entering the mixing chamber 56. When fuel 24 that is injected from the fuel injection valve 13 is deposited on the inner surface of the sub-passage 75, the liquid film is kept uniform, and effective promotion of vaporization is ensured.

Further, the feed passage from sub-passage 75 to the main passage is formed in a deflected shape. This reduces the speed component in the straight forward direction, and, hence, increases swirling force occurring in the swirl nozzle 51. This increases the frequency of swirling of the liquid fuel film on the heat transfer surface and increases the time that the fuel remains deposited on the sub-passage 75.

Figure 5:
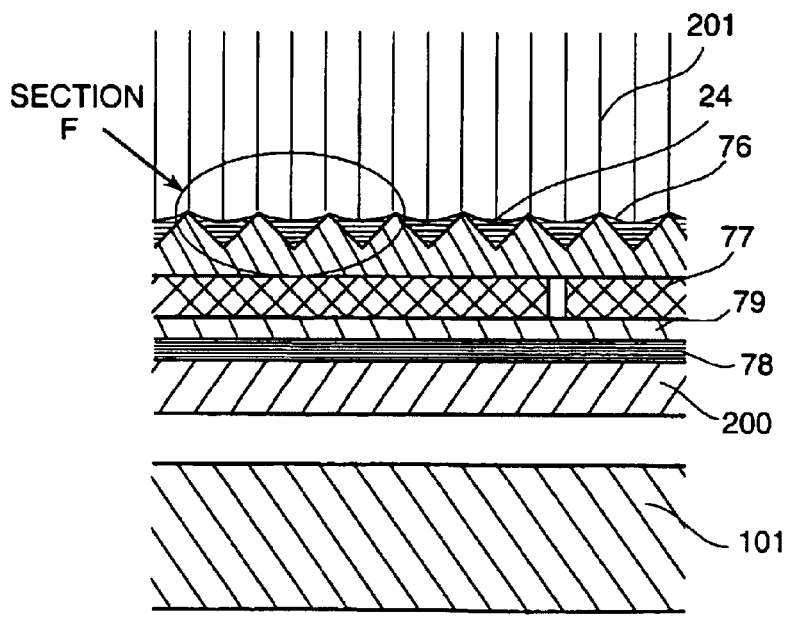
FIG. 5 is an enlarged cross-sectional view of a groove of the heat transfer unit of the fuel vaporization promoting apparatus of FIG. 3 according to the present invention.

FIG. 5 is an enlarged cross-sectional view of section E in FIG. 3. internal cylinder 200 is arranged so as to be spaced by specified air layer from the inner peripheral surface of the heater body 101. An elastic member 78 formed of an elastic material is arranged on the inner peripheral surface of the internal cylinder 200 in surface contact therewith. Positive electrode plate 79 is arranged on the surface inside the elastic member 78 in surface contact therewith. The PTC heater 77 is in surface contact with the surface inside the positive electrode plate 79. The surface inside the PTC heater 77 is in surface contact with the outer surface of the member forming the heat transfer surface 76. This configuration provides surface contact among the positive electrode plate 79, PTC heater 77 and heat transfer surface 76. Here, the heat transfer surface 76 also serves as a negative electrode. Thus, when current is applied to the electrode terminals 28 and 29, current flows from the positive electrode plate 79 to the heat transfer surface 76 through the PTC heater 77. This causes the PTC heater 77 to generate heat, and the heat transfer surface 76 is heated.

The heat transfer surface formed by the inner peripheral surface of the sub-passage 75 is expanded by the groove 201 formed therein. At the same time, uniform dispersion of a liquid fuel film injected on the heat transfer surface is also ensured by this groove. This will be described in more detail later.

Figure 6:
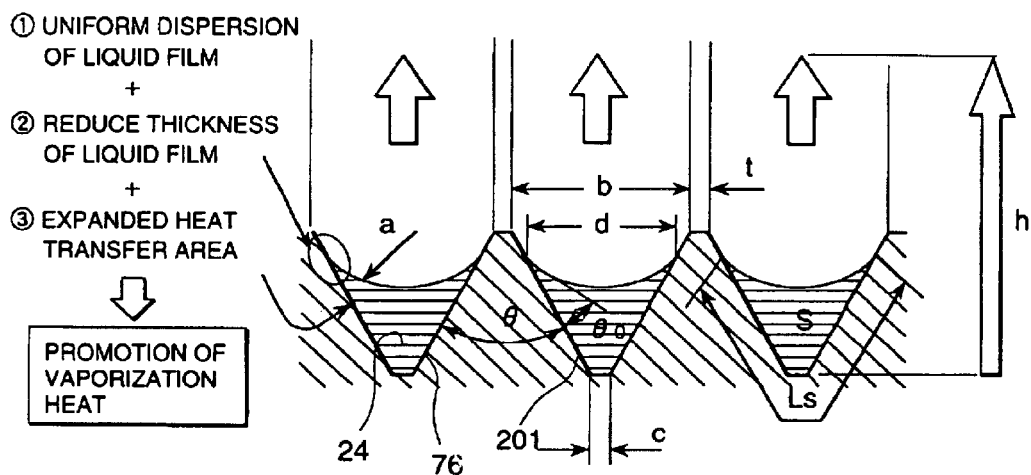
FIG. 6 is an enlarged cross-sectional view of a groove of the heat transfer unit of a fuel vaporization promoting apparatus of FIG. 5 according to the present invention.

FIG. 6 illustrates the profile of a groove formed on the heat transfer surface 76 of the fuel vaporization promoting apparatus 100. FIG. 6 is an enlarged view of section F in FIG. 5. The groove 201 is formed in a trapezoid shape with a groove aperture length b, groove bottom c and groove angle $\theta$. Grooves formed on the heat transfer surface 76 are connected with one another through groove top of width t. Thus, the groove pitch can be represented as "b+t". Further, fuel spray 85 that is supplied to the heat transfer surface 76 is stored in the groove 201 as liquid fuel 24.

In a given groove, the two points where the angled portion of the groove 201 and the gas-liquid boundary between fuel and air are in contact are assumed to form a gas-liquid boundary width d. Gasoline as fuel is assumed to have a good wettability, and the contact angle $\theta_0$ is zero. Thus, the gas-liquid boundary curvature radius a in the groove 201 can be expressed by Equation 1.

$$a=b/(2\cdot\cos(\theta/2)) \qquad \text{(Equation 1)}$$

where the gas-liquid boundary curvature radius a is a hypothetical curve different from the actual gas-liquid boundary curvature radius. A contact angle $\theta_0$ of zero means that its value is the same as that in tangential direction of the angled portion of the groove 201. If the inclined portion forms a curve, the contact angle $\theta_0$ has the same value as that in the tangential direction at a predetermined position of the curve. It is preferred that the length d of the groove aperture be the same as gas-liquid boundary width d. It is also preferred that the groove aperture length b be provided to ensure that the length d of the groove aperture is the same as gas-liquid boundary width d.

This is intended to ensure that fuel vaporization is promoted since the heat transfer surface 76, except for the groove top of width t, is not exposed directly to the air layer without a liquid fuel film.

Assume that the cross section of fuel 24 stored in a groove 201 is S, and the contact length between the fuel 24 and groove 201, where the tilted portion of the groove 201 is in contact with the gas-liquid boundary curvature radius a, is Ls. Then, fuel 24 stored in the groove 201 can be expressed as given in Equation 2 Since the surface tension working in the contact length Ls between the fuel and groove wall surface is balanced with the weight of fuel raised in the groove. The height h of the liquid level raised by the surface tension is determined by the contact length Ls and liquid sectional area S, where $\sigma$ denotes the surface tension of the fuel, $\rho$ denotes the density and g denotes the weight acceleration.

$$h=(\sigma/(\rho\cdot g))\cdot(Ls/S) \qquad \text{(Equation 2)}$$

Equation 2 indicates that fuel height h can be raised to a predetermined level.

According to the relationship between the contact length Ls of the groove 201 and the liquid sectional area S, the liquid film of fuel 24 deposited on the heat transfer surface 76 can be <1> dispersed uniformly toward the inner periphery of the sub-passage 75. The feed air 22a passing through the sub-passage 75 and the atomizing air 23a each has a flow component in the direction of the axial flow in the sub-passage 75, so the liquid fuel film is effectively supplied to the downstream side of the heat transfer surface 76 to promote vaporization. Further, the angled portion in the groove 201 and the liquid film of the fuel 24 form a cross section of liquid at a gas-liquid boundary curvature radius a, so <2> the liquid fuel film is reduced in thickness locally in the groove. At the same time, formation of the groove 201 <3> increases the heat transfer area over that available when the heat transfer surface 76 has a smooth surface. This contributes to further promotion of vaporization. The difference in the pressure between the upstream and downstream sides of the throttle valve 131 may be changed by the operating conditions of the internal combustion engine. This results in changes in the amount of feed air 22a and atomizing air 23a. Accordingly, to ensure uniform supply of fuel spray 85 to the heat transfer surface 76 at all times, it is preferred that the groove 201 has a contact length Ls for ensuring that the raised height of liquid level will exceed the inner diameter of the sub-passage 75 and the cross section of the liquid S.

Figure 15:
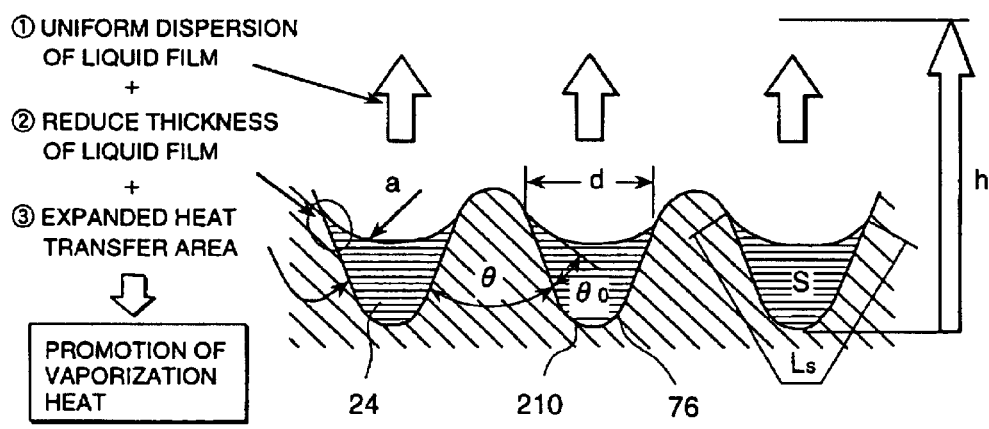
FIG. 15 is a cross-sectional view representing an example wherein the cross-section of a groove in FIG. 6 is represented by a profile formed by linking curves.

The cross-section of groove 201 shown in FIG. 6 has a trapezoidal form connected in a straight line. It is also possible to use a profile in which the groove is linked by a curve at the root and tip, as shown in FIG. 15. Such a configuration has the advantage of dispersing the liquid fuel film along the internal wall surface of the heat transfer surface 76, similarly to the case of the groove 201 formed in a trapezoidal shape.

Figure 7:
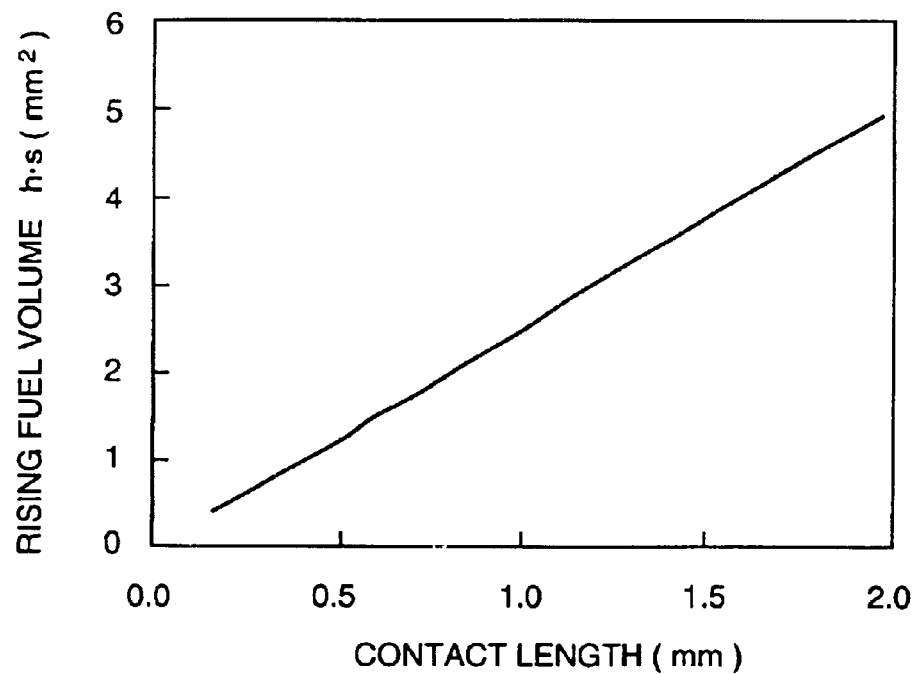
FIG. 7 is a graph representing the relationship between the contact length between fuel and groove, and the rising fuel volume represented by the raised liquid fuel level and the cross-sectional area of liquid portion.

FIG. 7 shows a graph representing the relationship between the contact length Ls between groove 201 and fuel 24, and h.S as a product of raised liquid height h and the cross sectional area of the liquid portion S. Ls is proportional to h.S. It is apparent that h.S increases with contact length Ls. For example, when the cross section of a groove is formed in a predetermined profile, h.s will be about 1.41 mm³ when the gas-liquid boundary curvature radius in the groove is "a" and the contact length Ls is 0.56. The raised fuel height h in this case can be obtained from the previously assumed cross sectional area of liquid portion S. If the φd as an internal diameter of the sub-passage 75 is made smaller than this raised height "h", then the fuel 24 deposited on the heat transfer surface 76 can be supplied uniformly in the circumferential direction. In other words, it is only essential that the relationship $\phi d<(\sigma/(\rho \cdot g))/(Ls/S)$ be satisfied, where φd denotes the inner diameter cylindrical heat transfer unit, σ denotes the surface tension of fuel, g denotes gravity acceleration, Ls denotes the contact length between the heat transfer surface and fuel, and s denotes the cross-sectional area of fuel stored in the groove.

Figure 8:
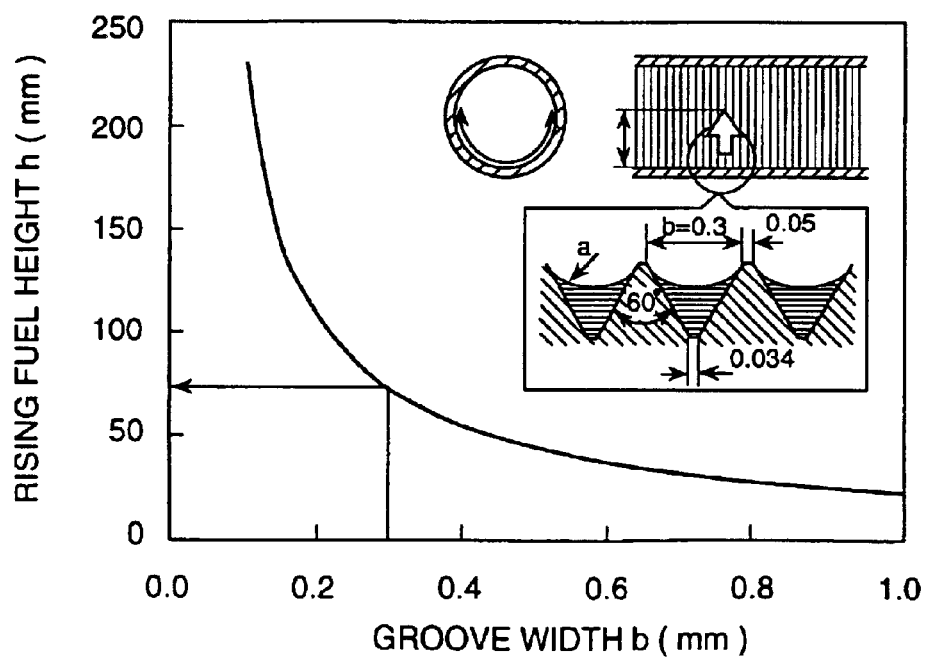
FIG. 8 is a graph representing the relationship between the width of a groove having a predetermined sectional profile and the raised liquid fuel.

FIG. 8 shows the relationship of raised fuel height h when the predetermined groove width is b. For example, when a trapezoidal groove has an aperture length b of 0.3 mm, a bottom length c of 0.034 mm and an angle of 60 deg., then the raised fuel height is about 71 mm, where the aperture length b and gas-liquid boundary width d are the same. Thus, it is preferred that φd, as an internal diameter of the sub-passage 75, be 71 mm or less. This permits the uniform dispersion of liquid film in the circumferential direction of the heat transfer surface 76 inside the sub-passage 75, with the result that fuel vaporization is promoted.

The amount of vaporized fuel can be increased when consideration is given to the groove profile of the heat transfer surface 76, with the result that the number of PTC heaters 77 can be reduced. This allows a downsized power-saving fuel vaporization promoting apparatus 100 to be produced.

Figure 9:
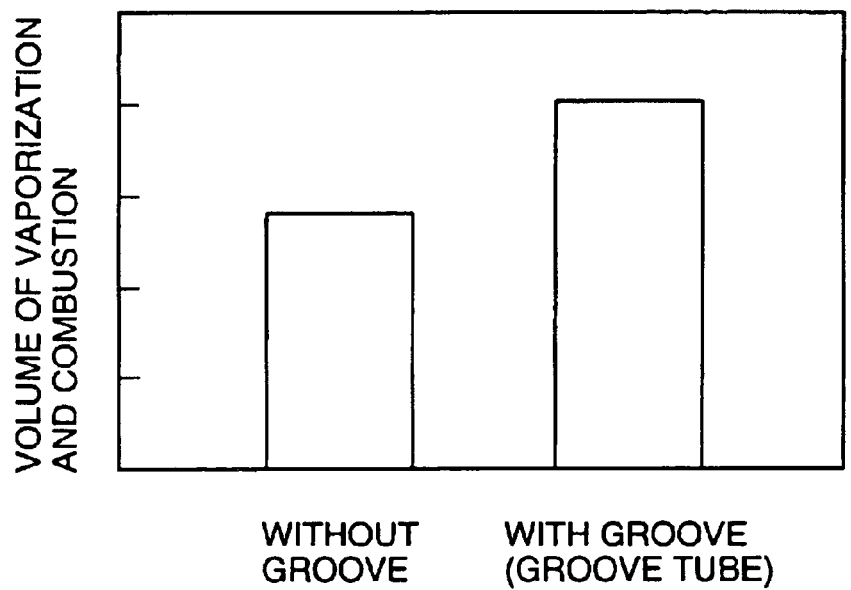
FIG. 9 is a graph representing the advantages of the profile of a groove on the heat transfer surface.

FIG. 9 shows the relationship between the amounts of fuel vaporized when a groove is formed on the heat transfer surface 76 of the fuel vaporization promoting apparatus 100 and when it is not formed. As a result of the above stated advantage, the amount of vaporized fuel can be increased by around 20 to 30 percent by formation of the optimized groove.

Figure 10A:
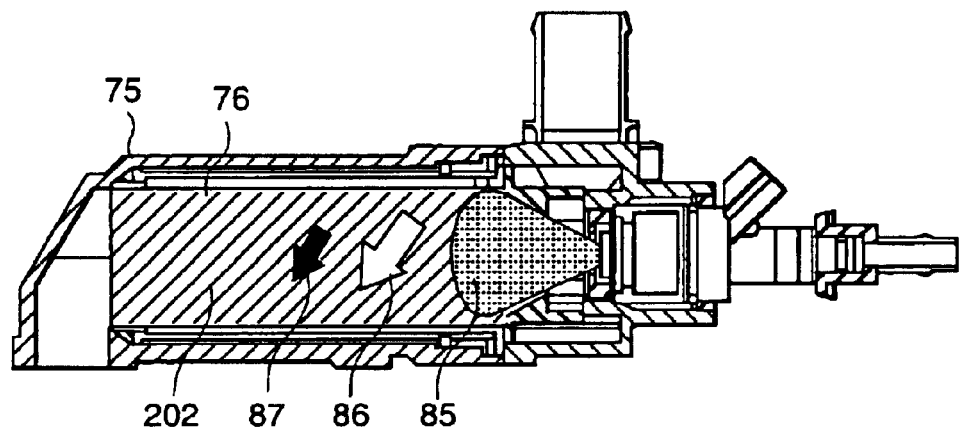
FIG. 10(*a*) is a cross-sectional view of a fuel vaporization promoting apparatus representing a second embodiment of the present invention.
Figure 10B:
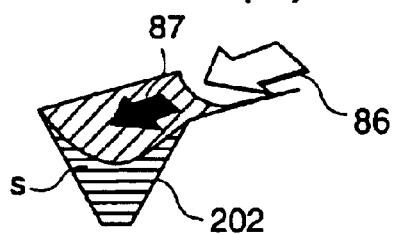
Figure 10C:
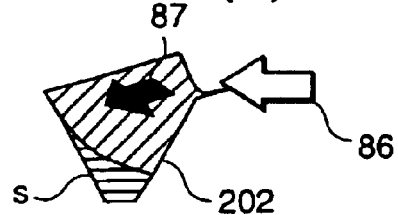

A second embodiment of the present invention will be described below with reference to FIGS. 10(a) to 10(c). The difference in configuration from that of the first embodiment is found in the method of forming a groove 202 shaped on the heat transfer surface 76. Otherwise, the configuration is the same as that of the first embodiment, so description thereof will be omitted. In the present embodiment, the groove 202 is formed on the heat transfer surface 76 almost in the same direction 87 as that of the sucked air swirl 86. The fuel spray 85 passing through the sub-passage 75 is supplied in a swirl by the suction flow of feed air 22a and atomizing air 23a, and it is deposited on the heat transfer surface 76. The deposited fuel 24 flows as a swirl flow 86 along the swirl flow of the sucked air. Thus, there is agreement between the direction 87 of the groove 202 formation and the direction of the swirl flow 86, so that the maximum value is given to the contact length Ls formed by the fuel 24 stored in the groove 202 and the heat transfer surface 76 in the groove. In other words, the direction of swirl flow 86 and that of the groove formation 87 are almost the same as shown in FIG. 10(b), and this provides a sufficient contact length Ls between the fuel 24 and the groove 202. However, if the direction of swirl flow 86 is different from that of groove formation 87, as shown in FIG. 10(c), then the contact length Ls between the fuel 24 and the groove 202 is reduced, and there is an increase in the area where there is no contact between the heat transfer surface and the fuel, with the result that the fuel vaporization efficiency will be reduced. Thus, it is preferred that the direction of swirl flow 86 be almost the same as that of the groove formation 87. This ensures an efficient supply of heat from the heat transfer surface 76 to the fuel 24, thereby further improving the fuel vaporization efficiency. Description of further operation and the advantages attendant thereto will be omitted, since they are the same as provided in the first embodiment of the present invention.

Figure 11:
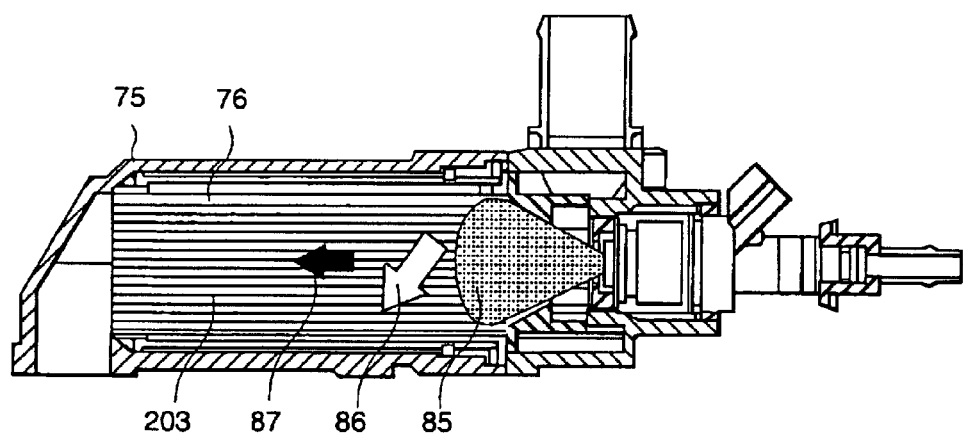
FIG. 11 is a cross-sectional view of a fuel vaporization promoting apparatus representing a third embodiment of the present invention.

A third embodiment of the present invention will be described with reference to FIG. 11. The difference in configuration from that of the first embodiment is found in the method for forming the groove 203 and its shape on the heat transfer surface 76. Otherwise, the configuration is the same as that of the first embodiment, and so a detailed description thereof will be omitted.

In the present embodiment, the groove 203 is formed on the heat transfer surface 76 almost in the same direction 87 as the axial flow direction of the sub-passage 75. Fuel spray 85 passing through the sub-passage 75 is supplied with a swirl by the suction flow of the feed air 22a and the atomizing air 23a, and it is deposited on the heat transfer surface 76. Here, the fuel spray 85 is deposited on the heat transfer surface 76 on the relatively further upstream side of itself. To solve this problem, the groove 203 is formed in the same direction 87 as that of the axial flow of the sub-passage 75. This causes the fuel to be fed downstream in the direction of axial flow by the surface tension of fuel 24 deposited on the heat transfer surface 76, with the result that there is a quick and uniform formation of liquid fuel film on the heat transfer surface 76, thereby improving the fuel vaporization efficiency. A description of further operation and attendant advantages will be omitted since they are the same as those in the first embodiment of the present invention.

Figure 12:
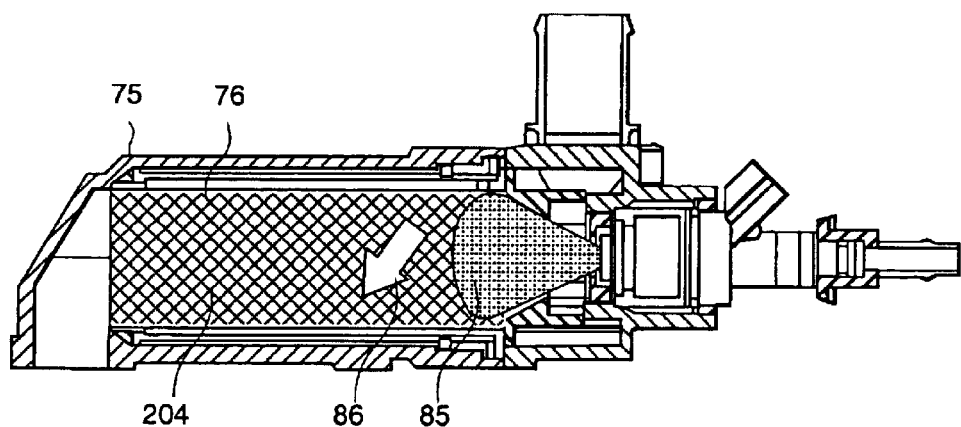
FIG. 12 is a cross-sectional view of a fuel vaporization promoting apparatus representing a fourth embodiment of the present invention.

A fourth embodiment of the present invention will be described below with reference to FIG. 12. The difference in configuration from that of the first embodiment is found in the method for forming a groove 204 and its shape on the heat transfer surface 76. Otherwise, the configuration is the same as that of the first embodiment, and so a detailed description thereof will be omitted.

In the present embodiment, a lattice-shaped groove 204 of irregular form is provided on the heat transfer surface 76. It has a diamond-knurled profile provided with very fine irregularities. This configuration provides a groove profile relatively faithfully conforming to the sucked airflow 86 running over the heat transfer surface 76. Further, the fuel stored in the groove 204 can be dispersed by surface tension simultaneously in the circumferential direction and in the direction of axial flow, with the result that fuel vaporization efficiency is improved. A description of further operation and attendant advantages will be omitted since they are the same as those in the first embodiment of the present invention.

The above description has dealt with the profile of a groove formed on the heat transfer surface 76 in the first to fourth embodiments. It should be noted that the groove profile is not restricted to those described above. The same advantages can be obtained if the heat transfer surface 76 is provided with very fine irregularities therein for promoting vaporization of fuel by positive dispersion of the liquid film. The irregularities formed on the heat transfer surface 76 have been described as those having a uniform heat transfer area of the groove per unit area of the heat transfer surface in the present embodiments. However, fuel spray 85 is injected from the upstream side of the heat transfer surface 76, so that it tends to be deposited on the upstream side of the heat transfer surface 76, and the liquid fuel film also tends to be thick. Accordingly, to ensure that heat supplied from the heater is effectively transferred to the liquid fuel film through the heat transfer surface, and to improve the vaporization efficiency, it is preferred that the heat transfer area of the heat transfer surface 76 on the portion where the liquid fuel film is thicker should be increased, and the heat transfer area on the portion where liquid fuel film is thinner should be decreased. In the heat transfer surface 76 arranged inside the sub-passage 75, therefore, it is preferred that irregularities should be formed in such a way that the heat transfer area of the heat transfer surface 76 on the upstream side is made greater continuously or stepwise than that on the downstream side. This promotes heat transfer of the liquid fuel film formed on the heat transfer surfaces, thereby reducing the power consumption.

An embodiment presenting an example of the installation state of the present invention will be described with reference to FIG. 13.

Figure 13:
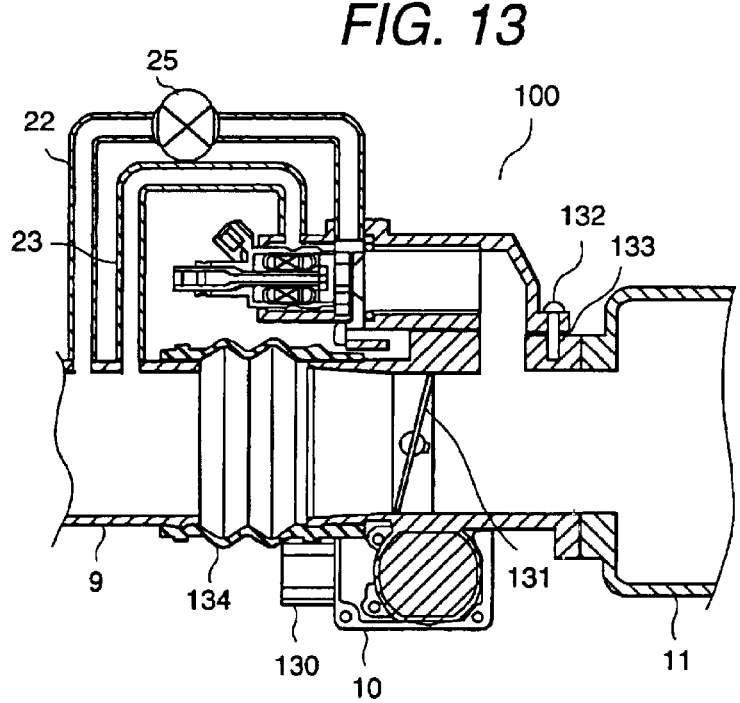
FIG. 13 is a cross-sectional view showing how a fuel vaporization promoting apparatus is installed.

FIG. 13 shows an example of how the present invention may be installed on an electronically controlled throttle valve 10. The fuel vaporization promoting apparatus 100 and electronically controlled throttle valve 10 are sealed by a gasket 133, and they are locked by multiple screws. Use of a negative electrode cable can be eliminated by locking the negative electrode of the heater with a screw 132.

Use of an internal combustion engine comprising the above-described fuel vaporization promoting apparatus reduces the HC discharged from the internal combustion engine. This feature will be described below with reference to FIG. 14.

Figure 14A:
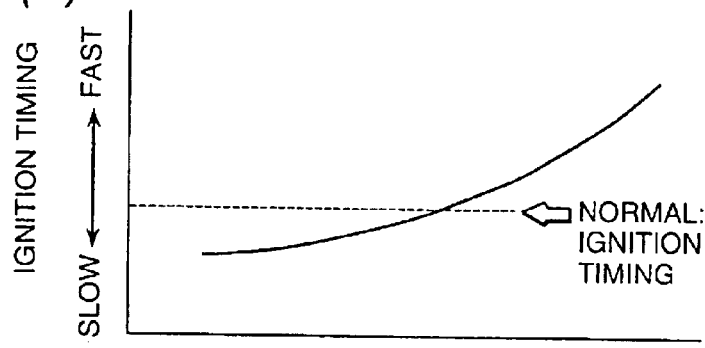
FIGS. 14(a), 14(b) and 14(c) are a series of graphs representing the relationship among fuel vaporization, ignition timing, catalyst temperature and the amount of HC emission.
Figure 14B:
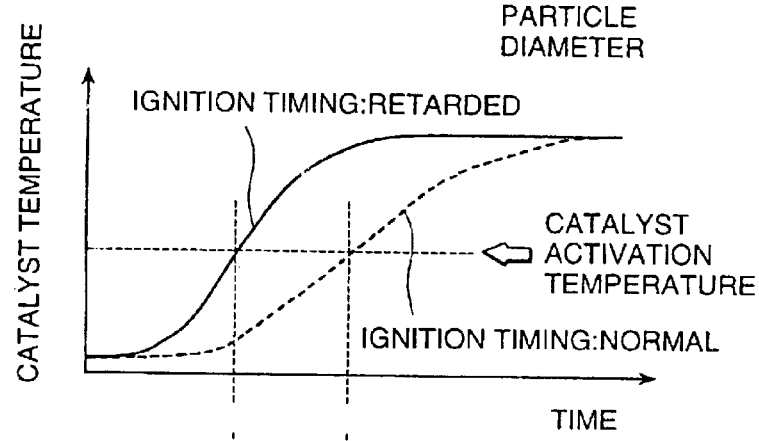
Figure 14C:
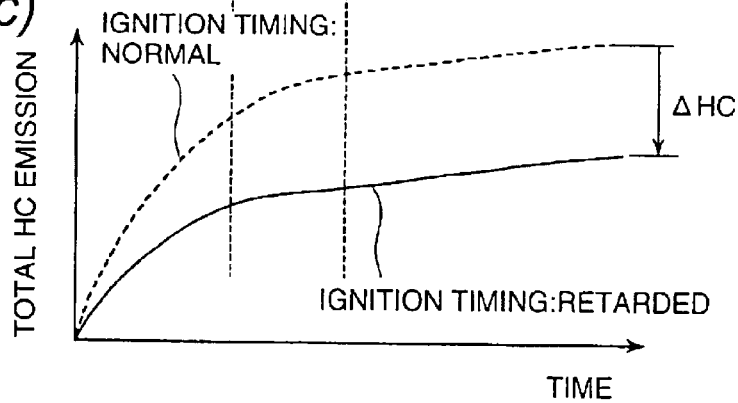

FIG. 14(*a*) shows a graph representing the relationship between the particle diameter of a fuel spray and the limit of the ignition time which can be retarded while combustion stability is maintained. The particle diameter of fuel spray obtained from the embodiments of the present invention allows the ignition time to be retarded until the expansion cycle starts; this is intended to ensure that fuel can be fed into the combustion chamber of the internal combustion engine in a perfectly vaporized state. If ignition is performed in the expansion cycle, there will be a decrease in the percentage of the combustion gas expanding in the combustion chamber. This reduces the amount of heat consumed by the combustion gas in the process of expansion. Combustion gas can be discharged into an exhaust pipe with the temperature maintained high. In other words, catalyst 21 can be quickly warmed by retarding the ignition time and discharging high-temperature combustion gas, as shown in FIG. 14(*b*). This will reduce the time required until the catalyst 21 reaches the temperature for activation after the internal combustion engine has started. In other words, purification of the catalyst 21 starts earlier as shown in FIG. 14(*c*), resulting in a substantial reduction in the amount of HC discharged after startup of the internal combustion engine 1. Earlier warming up by the catalyst (three-way component catalyst) decreases the amount of NOx and CO in addition to HC.

The foregoing description of the present invention has dealt with the means for forming a thin liquid film by dispersing liquid fuel film on the heat transfer surface 76 in the sub-passage 75 of the fuel vaporization promoting apparatus 100. To expand the liquid fuel film, the same advantages as those of the present embodiment can be obtained by providing the heat transfer surface 76 with superhydrophilic treatment, in addition to the method of using suction air or the method of using the surface tension acting on the fuel and the groove by forming a very fine groove on the heat transfer surface 76.

According to the present invention, a liquid fuel film supplied to the heat transfer surface can be made thinner, and it can be uniformly dispersed by forming an irregular profile on the heat transfer surface so as to disperse the fuel spray through surface tension of the surface in contact with the fuel spray deposited on the heat transfer surface, or by providing the heat transfer surface with superhydrophilic treatment. Irregular profiles on the heat transfer surface allow the heat transfer area to be expanded and the fuel vaporization efficiency to be improved. This results in a reduction in the number of heaters, a decrease in the power consumption, a downsizing of the heater unit, easy incorporation of the heater into the throttle body and intake manifold, and easy installation of the heater on the engine.

The atomization efficiency of the fuel spray is improved and fuel spray is fed downstream by confluence of the first air flow (assist air) with the injected fuel at the outlet of the fuel injection valve. On the further downstream side of the point where the first air flow is converged, the spray is made hit spray on the surface of the heat transfer unit through confluence of the second air flow, which is uniformly swirled from the scroll-formed air passage formed in such a way that the flow rate at the aperture located on the outer periphery of the fuel spray fed by the first air flow and arranged on the circumference will be constant. A thinner liquid fuel film and further uniform dispersion are ensured by two air flows merging with the fuel spray.

Improvement of the vaporization efficiency will reduce the electrical energy consumption and will enhance heater reliability and durability. It also promotes spray atomization and vaporization at the time of low-temperature startup, reduces the amount of fuel deposited on the inner wall of the intake tube, improves the startability of the internal combustion engine, cuts down fuel costs and promotes purification of the exhaust gas.

The present invention promotes vaporization of the fuel spray and reduces deposition of the fuel spray on in the wall surface, thereby ensuring improved startability of the internal combustion engine, reduced fuel cost and improved purification of the exhaust gas.

Figure 16:
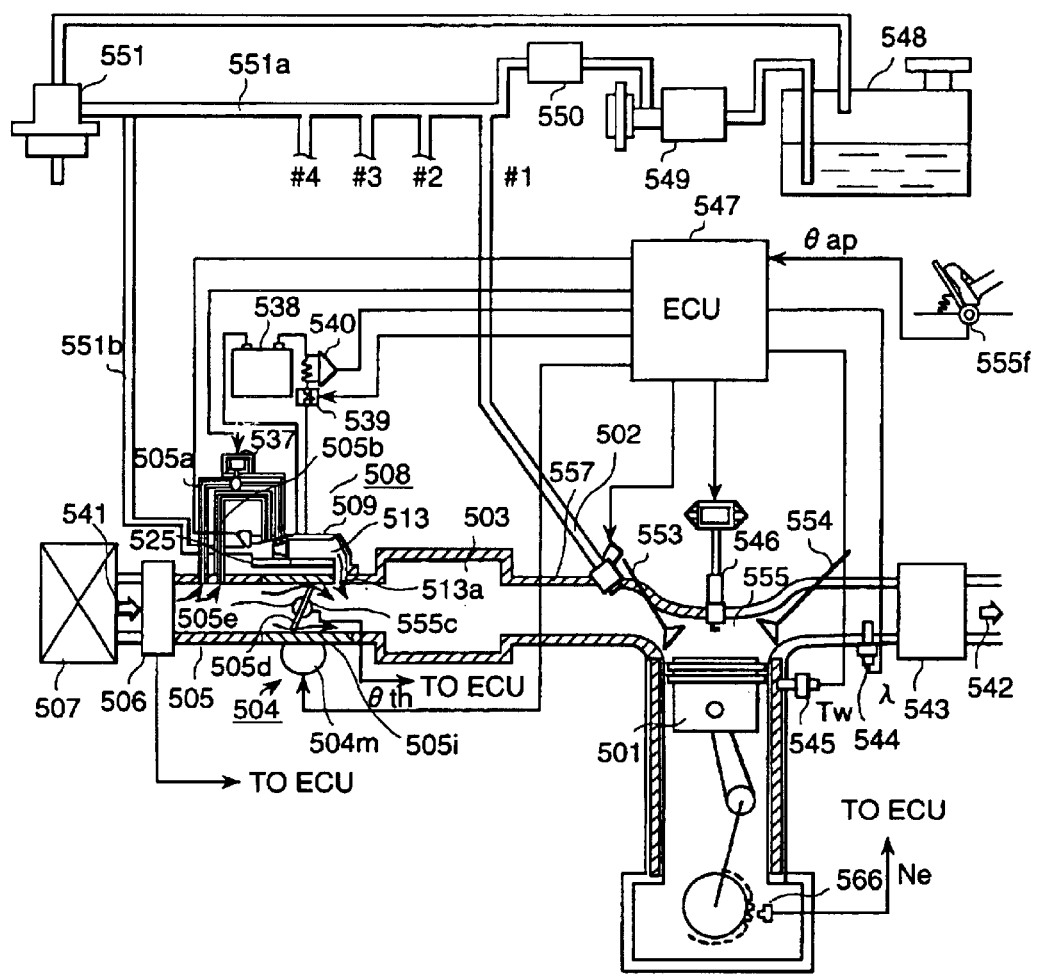
FIG. 16 is a schematic diagram showing the fuel carburetion accelerator according to an embodiment of the present invention, and a system having this fuel carburetion accelerator.

Another embodiment of the present invention will be described below with reference to FIGS. 16 and 17.

In the combustion chamber 555 of internal combustion engine 501, there is an ignition plug 546, an air suction valve 553 for taking in air and an air-fuel mixture, and an exhaust valve 554 for releasing the gas created by combustion. On the side wall of the combustion chamber 555 of the internal combustion engine 501, there is a water temperature sensor 545 for detecting the temperature of the engine coolant, and an engine speed sensor 556 is provided for detecting the engine speed, thereby to detect the operational status of the internal combustion engine.

The air suction system for taking air into combustion chamber 555 includes an air cleaner 507, an air flow sensor 506, an air suction pipe 505, and an electronically controlled throttle valve 504 for electrically controlling the amount of the air intake. The electronically controlled throttle valve 504 is connected at its downstream end to an intake air collecting pipe 503 (also called a surge tank) and is constructed so that air and an air-fuel mixture are introduced into the combustion chamber 555 with the opening and closing of the air suction valve 553. The intake air collecting pipe 503 is connected to each cylinder of the internal combustion engine via a suction manifold 557.

The angle "Θth" of the electronically controlled throttle valve 504 is detected by a throttle angle sensor 505e, and the output thereof is sent to an ECU 547. The ECU 547, after receiving signals, such as a signal θap from an accelerator pedal stepping stroke sensor 505f, a signal Qa from air flow sensor 506, and a signal Tw from water temperature sensor 545, or a signal Ne from engine speed sensor 556, analyzes these signals and computes the target angle of the throttle valve. The motor 504m of the electronically controlled throttle valve 504 is driven according to the computed target angle and the output of the throttle angle sensor 505e.

The motor 504m of the electronically controlled throttle valve 504 is installed on a throttle body 505i. The air suction channel formed inside the throttle body 505i has a throttle valve 505c, which is supported by throttle body 505i so as to be rotatable by means of a throttle shaft 505d. The rotational force of the motor 504m is transmitted to throttle shaft 505d via a reduction gear. In this way, the throttle valve 505c is rotationally driven by motor 504m. Such a throttle valve mechanism is also referred to as a motor-driven throttle valve unit.

The fuel injection unit in this embodiment comprises a first fuel injection valve and a second fuel injection valve. The first fuel injection valve 502 is installed at the suction port of the suction manifold 557 so that fuel is injected towards the suction valve 553 of each cylinder, downstream at the suction air collecting pipe. The second fuel injection valve 525 is installed at a fuel carburetion accelerator 508, and the injected fuel, after being carburized by fuel carburetion accelerator 508, flows through a hole 513a formed downstream of the throttle valve 505c, where it enters the suction channel, and then it is introduced into the suction air collecting pipe 503.

The fuel to be supplied to fuel injection valves 502 and 525 is pumped from a fuel tank 548 by a fuel pump 549 and is pressure-fed to fuel injection valves 502 and 525 via a fuel filter 550. The supply pressure of the fuel is adjusted by a pressure regulator 551 installed downstream at the fuel injection valves of each cylinder (cylinder #1, #2, and so on), and adjustments are performed for a constant pressure difference with respect to the suction pipe pressure.

The exhaust system comprises an oxygen concentration sensor 544 for detecting the concentration of the oxygen contained in the gas emissions from the exhaust ports equipped with the exhaust valves 554 of the cylinders, a catalytic converter 543 of rhodium for purifying the exhaust gases, a muffler not shown in the figure, and other elements.

The NOx, CO, and HC gases emitted from the internal combustion engine 501 during operation at an air-fuel ratio close to its theoretical value are simultaneously purified at a high purification ratio by the catalytic converter 543.

Upstream of the electronically controlled throttle valve 504, fuel carburetion accelerator 508 has bypass channels 505a and 505b that are connected to an open-ended branching channel leading from suction pipe 505, so that the air whose flow rate has been calculated by air flow sensor 506 is introduced into the fuel carburetion accelerator, whereby the flow of the air is bypassed downstream from the upstream side of the electronically controlled throttle valve. Bypass channel 505a is an air channel intended to transport the fuel 519 that has been injected from the second fuel injection valve 525, and the amount of air flowing through bypass channel 505a is adjusted by a flow control valve provided halfway in the bypass channel. Bypass channel 505b is an air-assist-use air channel intended to atomize the fuel 519 injected from the second fuel injection valve 525.

In the above configuration, a mixture of suction air 541 and the fuel that has been injected from fuel injection valves 502 and 525 is taken into the combustion chamber 555. The mixture that has thus been taken in is compressed, then fired by ignition plug 546, and burnt. Exhaust air 542 expelled from the internal combustion chamber 501 is cleared of HC, NOx, and other harmful components by the catalytic converter 543, and then it is released from the exhaust system to the atmosphere.

Figure 23A:
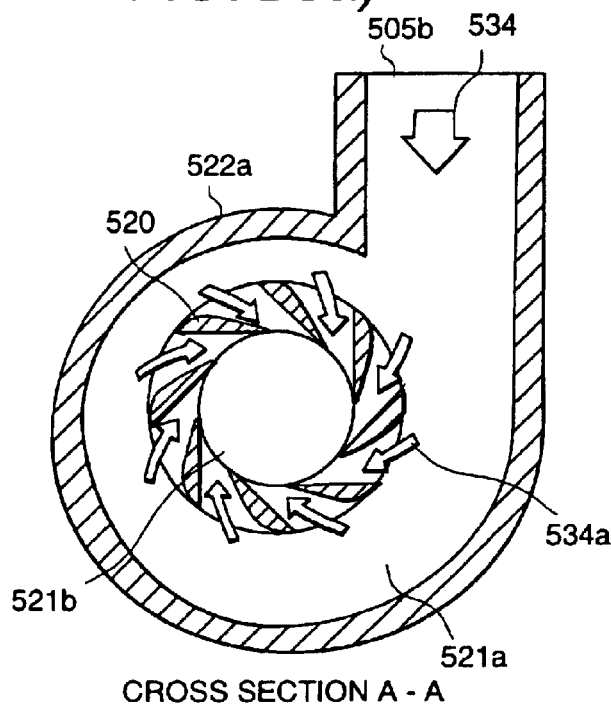
FIG. 23(a) is a cross-sectional view taken on the A—A' cross section shown in FIGS. 15, 18, 20 and 21, of a swirling nozzle vane for bringing the fuel into uniform contact, and a transport air channel.
Figure 23B:
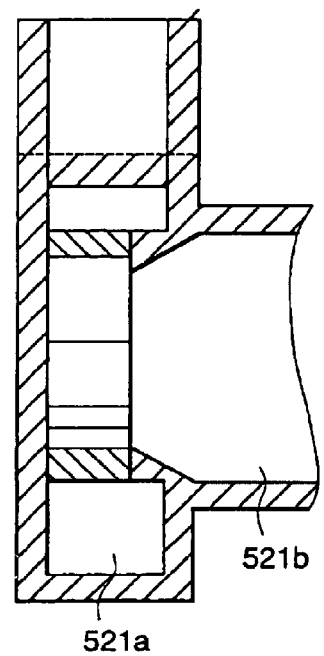
FIG. 23(b) is a side sectional view of the structure shown in FIG. 23(a)

The configuration of the fuel carburetion accelerator 508 will be described in further detail below with reference to FIGS. 17, 23(a) and 23(b).

The throttle body 505i of the electronically controlled throttle valve 504 has a hole 513a in the peripheral wall located downstream of throttle valve 505c, and the outlet hole in the heater element 509 of the fuel carburetion accelerator 508 is connected to the above-mentioned hole 513a. Heater element 509 is cylindrically formed and installed parallel to the suction pipe, so that the mixture that has been carburized by heater element 509 is deflected through 90 degrees before being taken into the suction pipe.

Heater element 509 is equipped with an electroconductive metallic cylindrical member 513a mounted inside a resin body 509a, forming the outer wall of the heater element. In this embodiment, cylindrical member 513a is also called "sub-channel 513" on the basis that the cylindrical member functions as an air channel bypassing the main suction air channel. On the outer surface of cylindrical member 513a, six plate-like ceramic (PTC) heaters 510 are arranged in the peripheral direction at equal intervals. The upper and lower plane sections of the ceramic (PTC) heaters 510 function as electrodes, and these heaters will generate heat when a current is applied to the upper and lower electrodes.

Another type of PTC heater also may be used. When the temperature exceeds the required value, this PTC heater will abruptly increase in electrical resistance, reducing the current value, and thus it maintains the temperature at a constant value.

Each ceramic (PTC) heater 510 is mounted on and electrically connected to the outer surface of the cylindrical member 513a, functioning as a minus electrode. In addition, a plus electrode 512 extending in a longitudinal direction along the above-mentioned PTC heater is mounted on the outer surface of each ceramic (PTC) heater 510, and this electrode 512 is connected to an electrode 517 at the end of the electrode, which extends to the outside of the heater outer wall 509a. Plus electrode 512 is retained on the inner surface of a heat insulating member 511. Under the condition that the cylindrical member 513a, which is made of an electroconductive material, is in contact with an electrode 516, the cylindrical member is inserted into the outer wall 509a, and is press-fit into the inlet hole of the outer wall 509a. Electrodes 516 and 517 are electrically insulated from one another via an insulating member 515. Hence, the application of power to electrodes 516 and 517 activates ceramic (PTC) heater 510 to heat the cylindrical member 513a which forms the sub-channel 513.

An O-ring 514, that comes into contact with the inner surface of the outer layer member 509a and provides sealing from the sub-channel 513 inside, is provided on the periphery of the insertion end of cylindrical member 513a. A gasket 518 is provided between the edge of the heater element 509, including the insertion rear edge of the cylindrical member 513a, and the body 522 (to be described later) that functions as an air introduction housing, and the edge of the heater element 509 and the body 522 are securely fastened using screws (to be described later) to seal both so that gasket 518 is compressed.

Second fuel injection valve 525, that is positioned in coaxial relationship with respect to heater body 509a, is installed at the side opposite to the heater element 509 in the air swirling element body 522. Fuel injection valve 525 is mounted on body 522 so that the inner channel is sealed by three elements (namely, an air atomizer 529 press-fit into an air-induction holed case 526, a gasket 528, and an O-ring 527), and it is fixed to body 522 via a fuel pipe 531 and a fuel pipe retainer. The fuel channel is sealed from outside by an O-ring 532 positioned between fuel pipe 531 and the fuel injection valve 525. The air swirling element body 522, which serves as a housing formed with a nozzle vane 520 which forms swirling air, also functions as a fuel injection valve installation housing and a heater element installation housing, so as to perform a plurality of functions with a single housing, and it is therefore useful for reducing the number of parts required. Also, fuel injection valve 525 and heater element 509 can be positioned easily by providing their reference positions at the housing of the air swirling element body 522.

In this embodiment, since a difference occurs between the pressures detected upstream and downstream of the electronically controlled throttle valve 504, when the throttle valve 505c of the electronically controlled throttle valve is closed, air will flow into the air channels 505a and 505b that bypass the electronically controlled throttle valve. Fuel carburetion accelerator 508 is located halfway in these air channels and activates the air atomizer 529 to bring assist air 535 into swirling collision with the fuel injected from the fuel injection valve 525 of the fuel carburetion accelerator, and then to atomize the fuel and increase the angle of injection before the fuel is injected as a spray 519 into a mixing chamber 521b. Bypass air 534, that has been introduced through an air introduction port 523 from bypass channel 505a, is converted into a swirling air current by nozzle vane 520 and is introduced into mixing chamber 521b, where the bypass air then collides with the fuel that has been injected from fuel injection valve 525, and, thus, a swirling mixture is formed. This swirling mixture comes into swirling contact with the cylindrical member 513a that forms the suction sub-channel 513 which has been heated by ceramic (PTC) heater 510, and it is carburized in suction sub-channel 513. The capacity of the heater and the area of the cylindrical member are designed so that sufficient carburetion is achieved during the passage of the mixture through sub-channel 513.

The cross-sectional shape of the mixing chamber 521 will be described in detail with reference to FIGS. 23(a) and 23(b). The mixing chamber has a plurality of nozzle vane portions which extend radially from the periphery of the mixing chamber towards its center. Each nozzle vane portion is formed with a large cross-sectional area at the air inlet side and a small cross-sectional area at the outlet side. Multiple nozzle vanes 520 are arranged at equal intervals radially around positions offset from the axial center of the air introduction port 523. In order to ensure that the constant velocity of the transport air current 534a passing through the channels between these nozzle vanes 520 is maintained, mixing chamber 521a is formed into a scroll shape for providing gradually reduced channel areas. The constant velocity of the transport air current 534a passing through the channels between the nozzle vanes 520 gives a uniformity to the liquid film coming into contact with the inner surface of the sub-channel 513, and thus enables efficient acceleration of the fuel carburetion.

Also, since the components that flow straight in a forward direction can be reduced by deflecting the introduction channel route from sub-channel 513 to the main channel, the swirling force generated by nozzle vanes 520 increases, which makes it possible to increase the dwell time of the fuel which comes into contact with sub-channel 513.

Further embodiments of structure which bring the fuel into uniform contact with the sub-channel 513 will be described below with reference to FIGS. 24(a) to 28(b).

Figure 17:
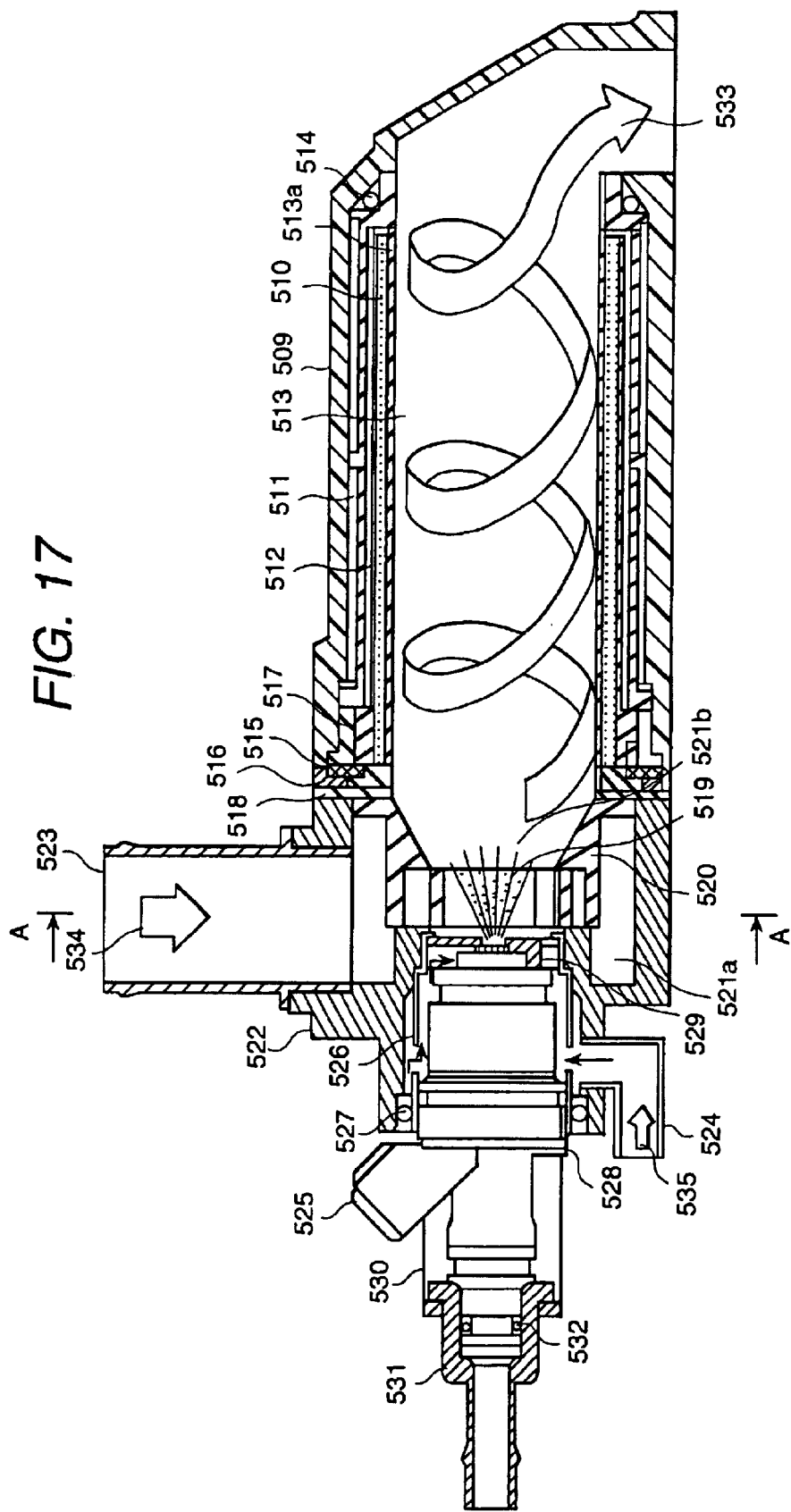
FIG. 17 is a longitudinal sectional view of the fuel carburetion accelerator according to the embodiment shown in FIG. 16.
Figure 24A:
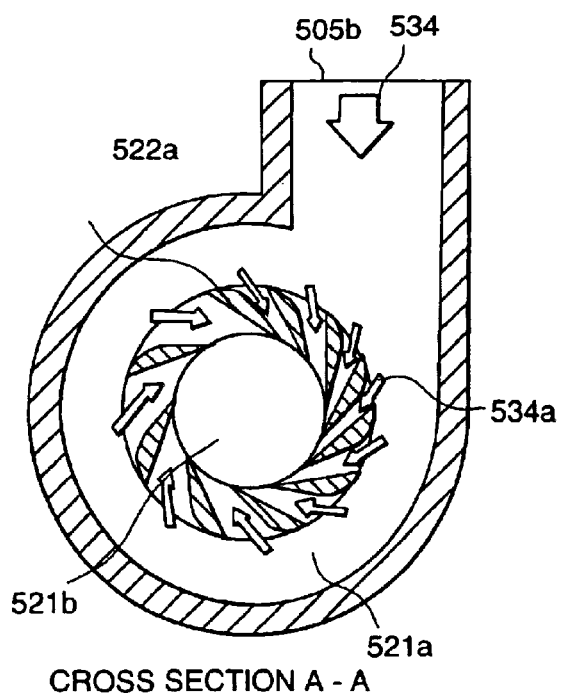
FIG. 24(a) is a cross-sectional view taken on the A—A' cross section shown in FIGS. 15, 18, 20 and 21, of another swirling nozzle vane for bringing the fuel into uniform contact and transport air channel.
Figure 24B:
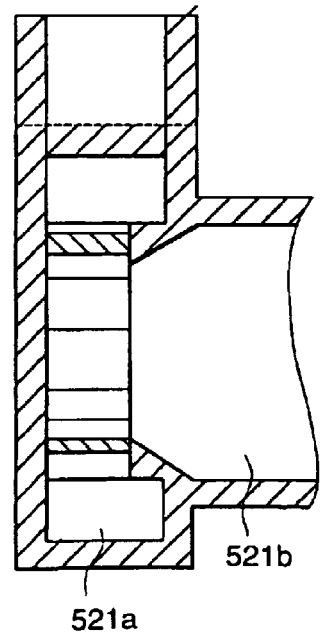
FIG. 24(b) is a side sectional view of the structure shown in FIG. 24(a)

FIG. 24(a) is a cross-sectional view of the A—A' section shown in FIG. 17 representing another embodiment. Under the corresponding structure, in which the bypass air 534 that has been bypassed by bypass channel 505a is introduced from one side of mixing chamber 521a, a plurality of nozzle vanes 520, having a cross-sectional shape with a large cross-sectional area at the air inlet side and a small cross-sectional area at the outlet side, are arranged circumferentially at positions offset from the axial center of the air introduction port, and the channel area of mixing chamber 521a is constant over the entire periphery. Nozzle vanes 520 have a shape to ensure that each has an open end in the flow direction of bypass air 534 and that the spacing between the nozzle vanes is small at the inlet of bypass air and gradually increases to achieve the passage of the transport air current 534a between the nozzle vanes at a constant velocity. Hereby, the amount of transport air current 534a flowing into mixing chamber 521b becomes equal, with the result that, when fuel spray 519 from fuel injection valve 525 comes into contact with the inner surface of the sub-channel 513, the liquid film becomes uniform and carburetion can be accelerated efficiently.

Figure 25A:
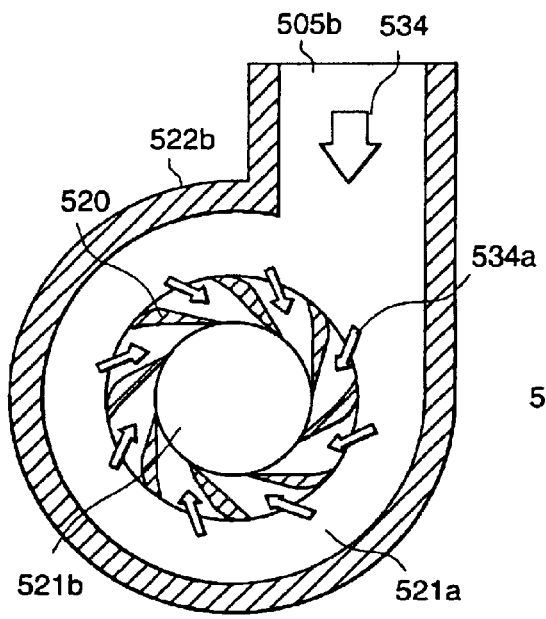
FIG. 25(a) is a cross-sectional view taken on the A—A' cross section shown in FIGS. 15, 18, 20 and 21, of yet another swirling nozzle vane for bringing the fuel into uniform contact and transport air channel.
Figure 25B:
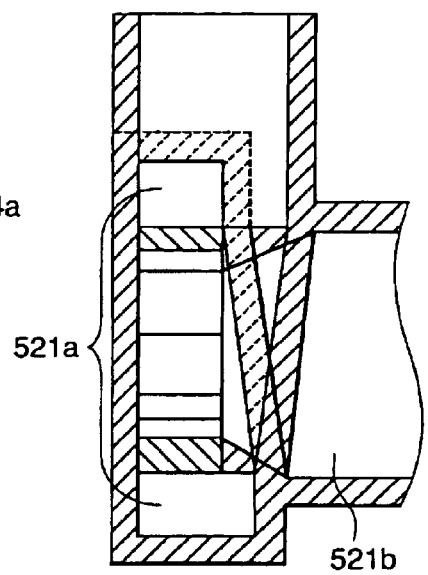
FIG. 25(b) is a side sectional view of the structure shown in FIG. 25(a)

FIG. 25(a) is a cross-sectional view of the A—A' section shown in FIG. 17 representing another embodiment. Under the corresponding structure, in which the bypass air 534 that has been bypassed by bypass channel 505a is introduced from one side of mixing chamber 521a, a plurality of nozzle vanes 520, having a cross-sectional shape with a large cross-sectional area at the air inlet side and a small cross-sectional area at the outlet side, are arranged circumferentially at positions offset from the axial center of the air introduction port. Nozzle vanes 520 have a swirling shape to ensure that each has an open end in the flow direction of bypass air 534 and that the cross-sectional area of mixing chamber 521a gradually decreases to achieve the passage of the transport air current 534a between the nozzle vanes at a constant velocity. The swirling structure can be adopted with a limited space by giving a constant outside diameter to mixing chamber 521a and gradually reducing its longitudinal height. Hereby, the amount of transport air current 534a flowing into the mixing chamber 521b becomes equal, with the result that, when fuel spray 519 from fuel injection valve 525 comes into contact with the inner surface of the sub-channel 513, the liquid film becomes uniform and carburetion can be accelerated efficiently.

Figure 26A:
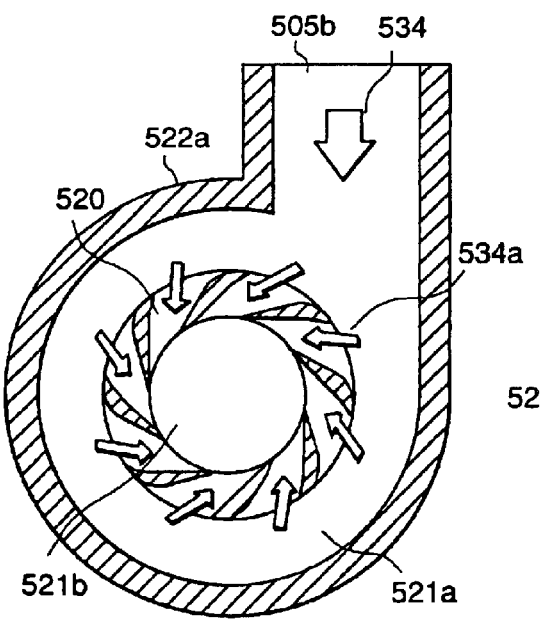
FIG. 26(a) is a cross-sectional view taken on the A—A' cross section shown in FIGS. 15, 18, 20 and 21, of a further swirling nozzle vane for bringing the fuel into uniform contact and transport air channel.
Figure 26B:
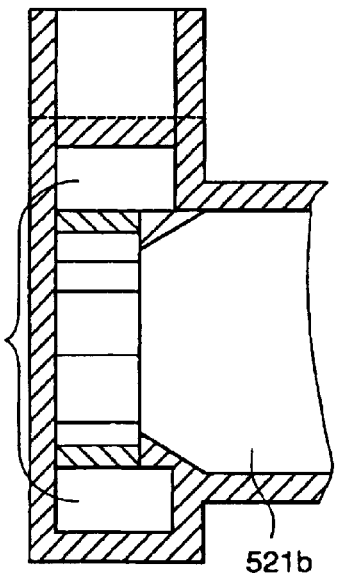
FIG. 26(b) is a side sectional view of the structure shown in FIG. 26(a)

FIG. 26(a) is a cross-sectional view of the A—A' section shown in FIG. 17 representing another embodiment. Under the corresponding structure, in which the bypass air 534 that has been bypassed by bypass channel 505a is introduced from one side of mixing chamber 521a, a plurality of nozzle vanes 520, having a cross-sectional shape with a large cross-sectional area at the air inlet side and a small cross-sectional area at the outlet side, are arranged circumferentially at positions offset from the axial center of the air introduction port. Each nozzle vane 520 has an open end in the opposite direction to the flow direction of bypass air 534. Hereby, the flow direction of air into the nozzle vane becomes opposite with respect to the flow direction of the bypass air 534 and is not easily affected by the flow of the bypass air. Hereby, the amount of transport air current 534a flowing into the mixing chamber 521b becomes equal, with the result that, when fuel spray 519 from fuel injection valve 525 comes into contact with the inner surface of the sub-channel 513, the liquid film becomes uniform and carburetion can be accelerated efficiently.

Figure 27A:
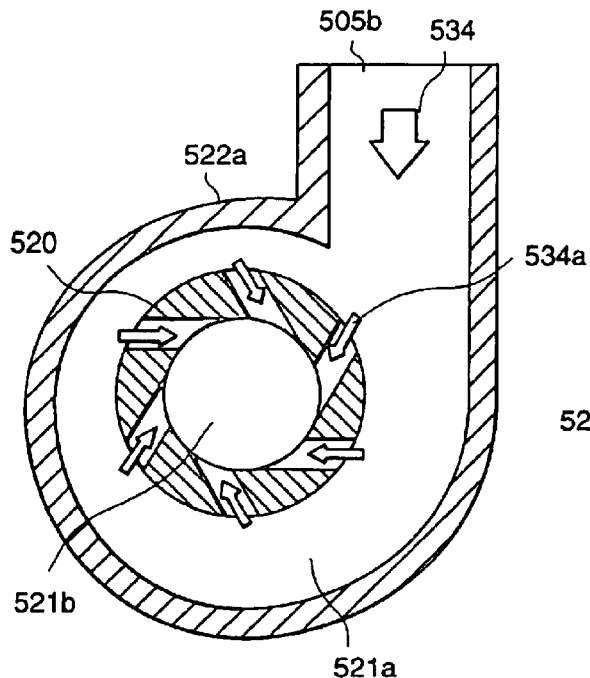
FIG. 27(a) is a cross-sectional view taken on the A—A' cross section shown in FIGS. 15, 18, 20 and 21, of a further swirling nozzle vane for bringing the fuel into uniform contact and transport air channel.
Figure 27B:
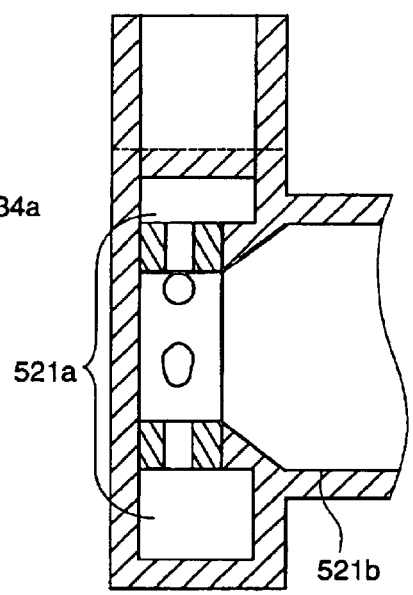
FIG. 27(b) is a side sectional view of the structure shown in FIG. 27(a)

FIG. 27(a) is a cross-sectional view of the A—A' section shown in FIG. 17 representing another embodiment. Under the corresponding structure, in which the bypass air 534 that has been bypassed by bypass channel 505a is introduced from one side of mixing chamber 521a, a plurality of nozzle vanes 520, having a cross-sectional shape providing channels in the form of a plurality of holes, are arranged circumferentially at positions offset from the axial center of the air introduction port, and the channel area of mixing chamber 521a is constant over the entire periphery. Nozzle vanes 520 have a shape to ensure that each has an open end in the flow direction of bypass air 534 and that the spacing between the nozzle vanes is small at the inlet of bypass air and gradually increases to achieve the passage of the transport air current 534a between the nozzle vanes at a constant velocity. Hereby, the amount of transport air current 534a flowing into mixing chamber 521b becomes equal, with the result that, when fuel spray 519 from fuel injection valve 525 comes into contact with the inner surface of the sub-channel 513, the liquid film becomes uniform and carburetion can be accelerated efficiently.

Figure 28A:
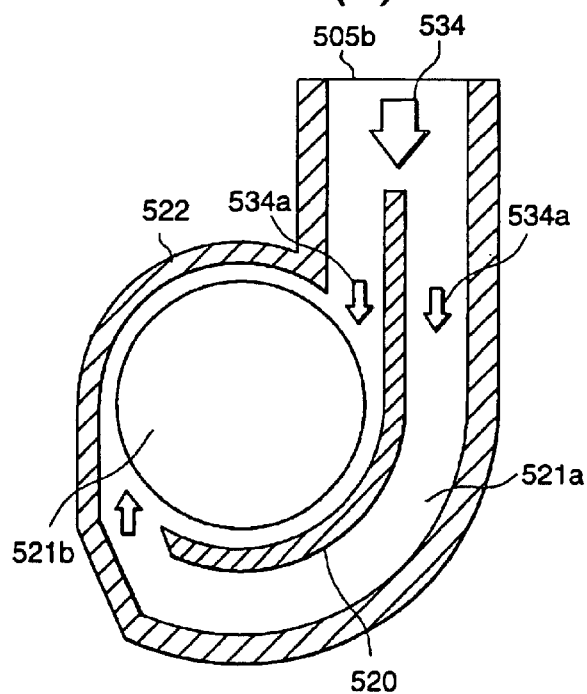
FIG. 28(a) is-a cross-sectional view taken on the A—A' cross section shown in FIGS. 15, 18, 20 and 21, of a further swirling nozzle vane for bringing the fuel into uniform contact, and a transport air channel.
Figure 28B:
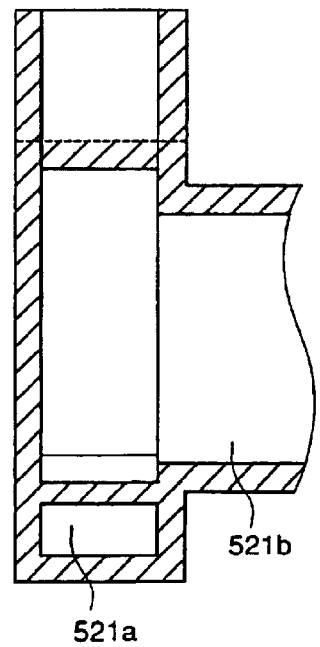
FIG. 28(b) is a side sectional view of the structure shown in FIG. 28(a)

FIG. 28(a) is a cross-sectional view of the A—A' section shown in FIG. 17 representing another embodiment. Under the corresponding structure, the bypass air 534 that has been bypassed by bypass channel 505a is introduced into a mixing chamber 521a which has been divided into two compartments and has two holes at positions offset through 180 degrees in phase angle. Because of air inflow from positions offset through 180 degrees in phase angle, the amount of transport air current 534a flowing into the mixing chamber 521b becomes equal, with the result that, when fuel spray 519 from fuel injection valve 525 comes into contact with the inner surface of the sub-channel 513, the liquid film becomes uniform and carburetion can be accelerated efficiently.

Figure 18:
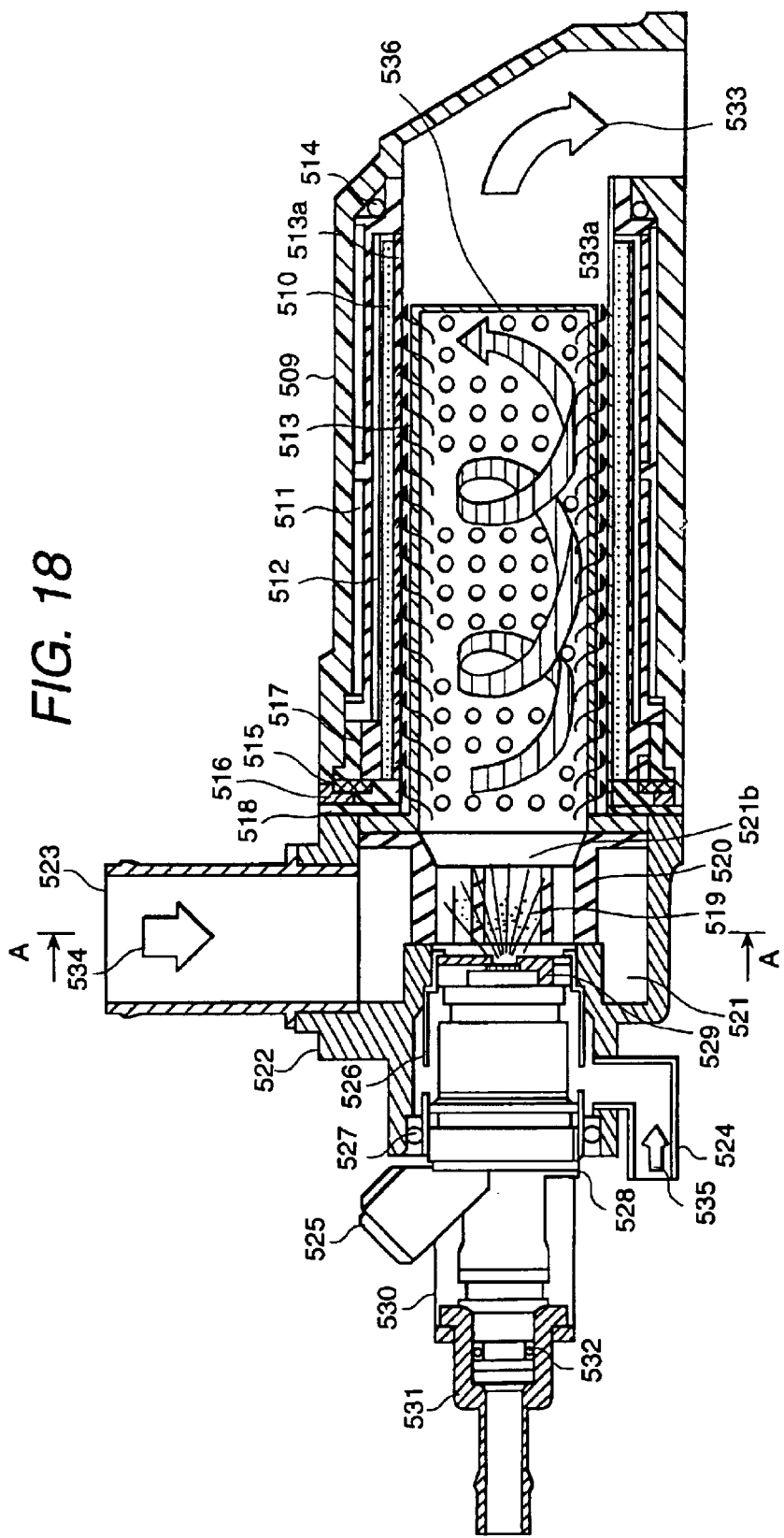
FIG. 18 is a longitudinal sectional view of the fuel carburetion accelerator according to an embodiment of the present invention.

Next, a further embodiment of the present invention will be described with reference FIG. 18.

The main difference between this embodiment and the embodiment shown in FIG. 17 is that a heat release plate 536 having a plurality of holes on its periphery to accelerate the carburetion of the fuel is added inside the sub-channel 513 that is heated by ceramic (PTC) heaters 510. No further description of the other elements of the second embodiment is provided, since it is the same as the first embodiment in all other respects.

With this further embodiment, the fuel spray 519 injected from fuel injection valve 525 is brought into swirling contact with the heat release plate 536 that is also partly brought into contact with the inner surface of the sub-channel 513, and heat is conducted from that section. Thus, the carburetion is accelerated. Also, the heaters can be made compact since the amount of uncarburized fuel coming into contact with sub-channel 513 can be reduced by bringing carburized fuel components, uncarburized fuel components, and bypass air 534 into contact with the inner surface of the sub-channel from the numerous holes provided in the heat release plate 536.

Figure 19:
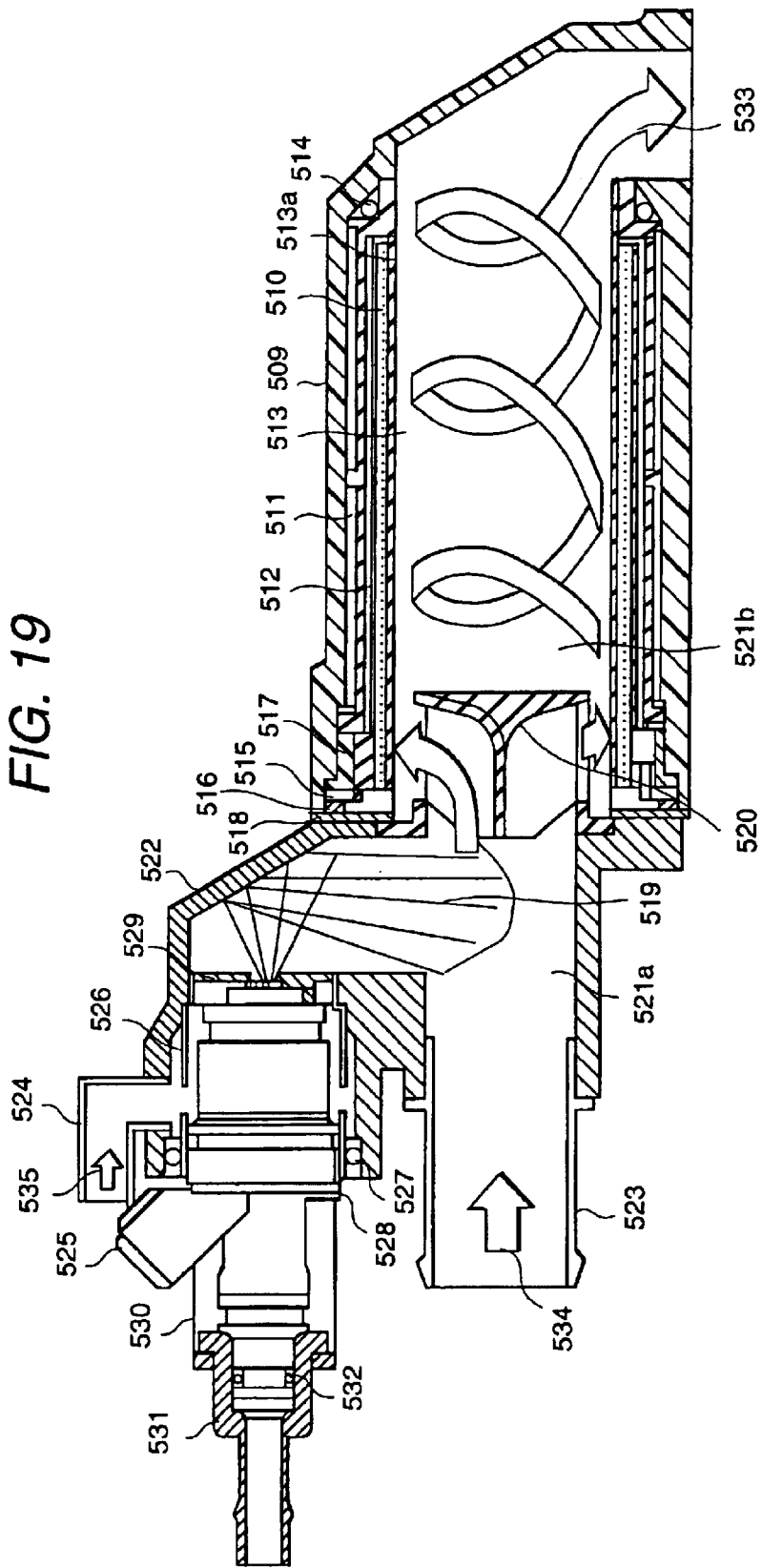
FIG. 19 is a longitudinal sectional view of the fuel carburetion accelerator according to an embodiment of the present invention.

Next, a further embodiment of the present invention will be described with reference to FIG. 19.

The main difference from the embodiment shown in FIG. 17 is that the second fuel injection valve 525 is constructed so as to inject fuel indirectly into the mixing chamber 521a. No further description of the other elements of the second embodiment is provided, since it is the same as the first embodiment in all other respects.

With this further embodiment, in which the second fuel injection valve 525 is constructed so as to inject the fuel indirectly into mixing chamber 521a, since a bypass channel is provided in coaxial form with respect to sub-channel 513 to ensure equal flow of bypass air 534 along the surface of sub-channel 513, swirling nozzle vanes 520 create a swirling air current and the air flows along the surface of sub-channel 513. It is also possible to mix air and fuel by use of bypass air 534 by providing the mixing chamber at the upstream side of swirling nozzle vanes 520, and thus to bring the mixture into equal contact with the inner surface of the sub-channel 513 by means of the swirling nozzle vanes 520.

The adoption of the configuration described above enables free installation of fuel injection valve 525, even If the fuel piping is restricted by the engine layout.

Figure 20:
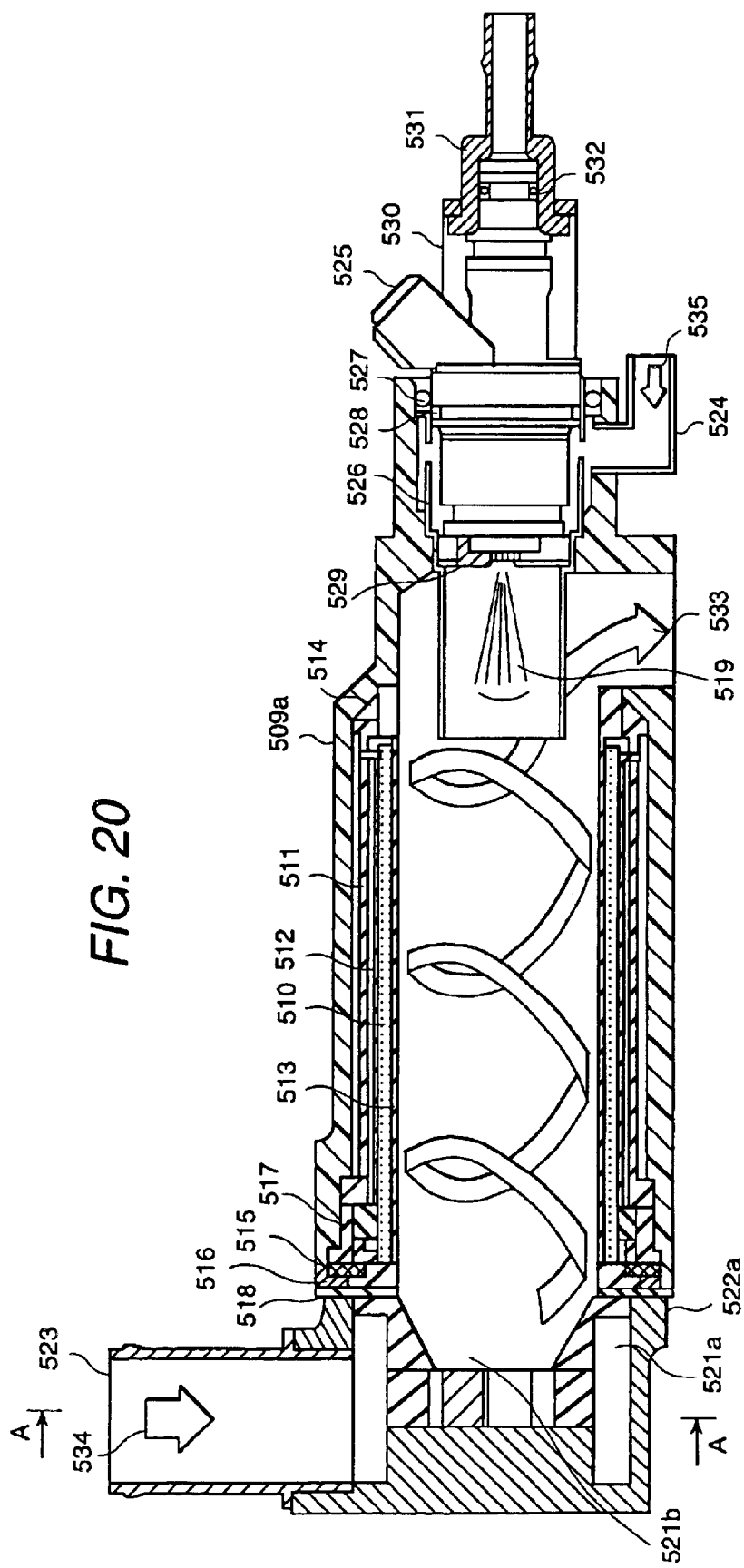
FIG. 20 is a longitudinal sectional view of the fuel carburetion accelerator according to an embodiment of the present invention.

Next, a further embodiment of the present invention will be described with reference to FIG. 20.

The main difference between this embodiment and the embodiment shown in FIG. 17 exists in the disposition of fuel injection valve 525 and that of swirling nozzle vanes 520. No further description of the other elements of this embodiment is provided since it is the same as the former embodiment in all other respects.

With this further embodiment, the second fuel injection valve 525 is installed on the downstream side of sub-channel 513, so as to inject a fuel spray in the opposite direction to the flow of air, and it is disposed on the axial line of the sub-channel and formed so that fuel is injected into the mixing chamber 21b to ensure collision of the fuel with the flow of bypass air 534. After being injected into the mixing chamber 521b, fuel spray 519 has its carburetion accelerated by colliding with the bypass air 534 which is provided as hot air. The fuel that has not been carburized is brought into swirling contact with the surface of sub-channel 513 and is carburized by the swirling air current generated by the action of swirling nozzle vanes 520. Therefore, the quantity of fuel coming into contact with the heater section will decrease and this will enable compact heater design.

Figure 21:
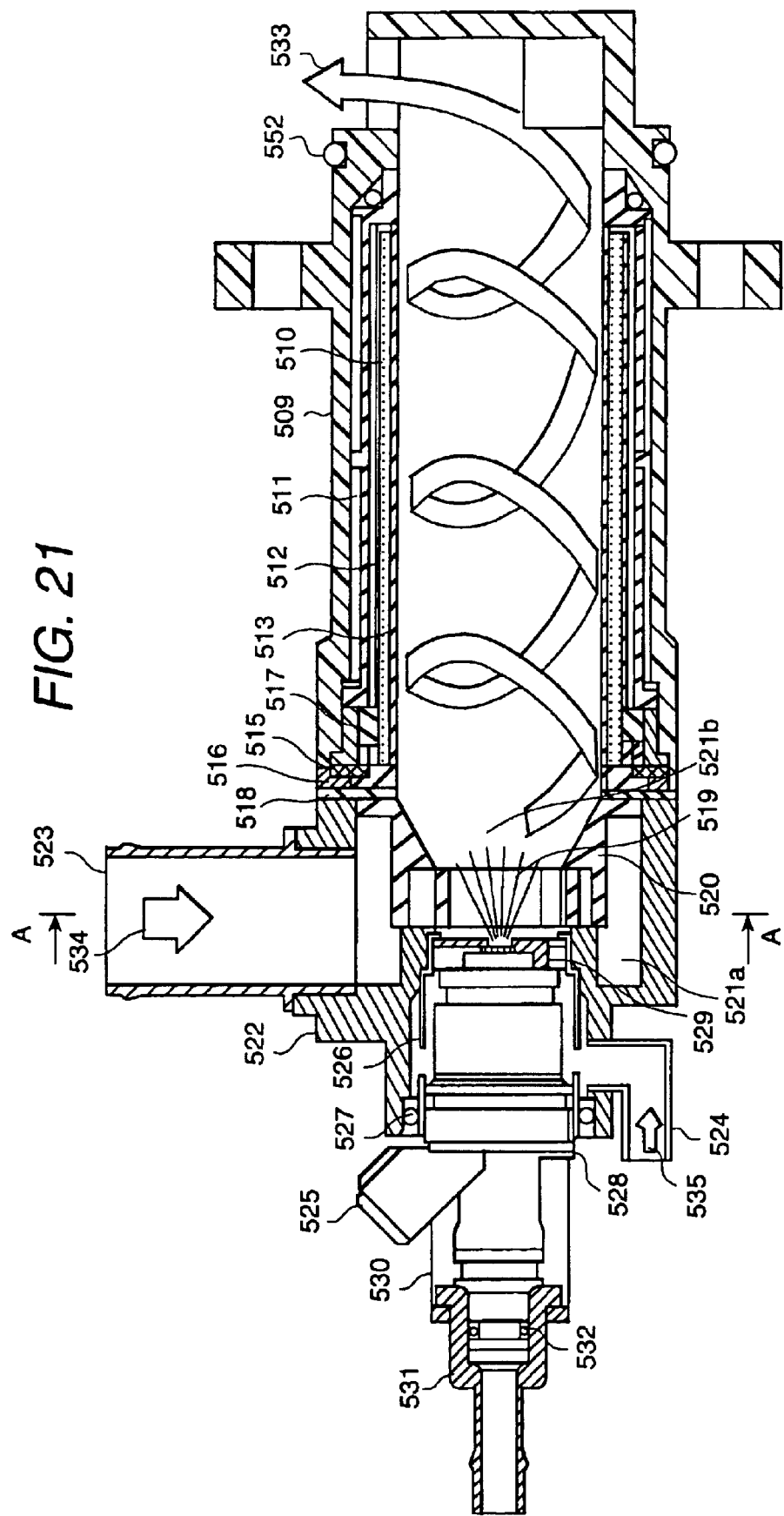
FIG. 21 is a longitudinal sectional view of the fuel carburetion accelerator according to an embodiment of the present invention.

Next, a still further embodiment of the present invention will be described with reference to FIG. 21.

The main difference between this embodiment and the embodiment shown in FIG. 17 exists in the shape of the sub-channel outlet portion. No further description of the other elements of the former embodiment is provided, since it is the same as the former embodiment in all other respects.

With this embodiment, the outlet portion of heater body 509a is configured so that the end of the outlet portion of heater body 509a is walled to avoid reduction in the swirling force of the fuel to be brought into contact with the inner surface of sub-channel 513 and so that carburized fuel is introduced from a plurality of holes, provided on the periphery of the outlet end, into the main channel. In this configuration, provision of swirling nozzle vanes at the outlet portion as well generates a greater swirling force, thus enabling the contact time of the fuel at the heater section to be increased. Therefore, the ceramic (PTC) heaters 510 can be reduced in size. Also, when this configuration is adopted, since the heater section can be embedded in the suction air collecting pipe, an internal space saving of the engine can be achieved.

Figure 22:
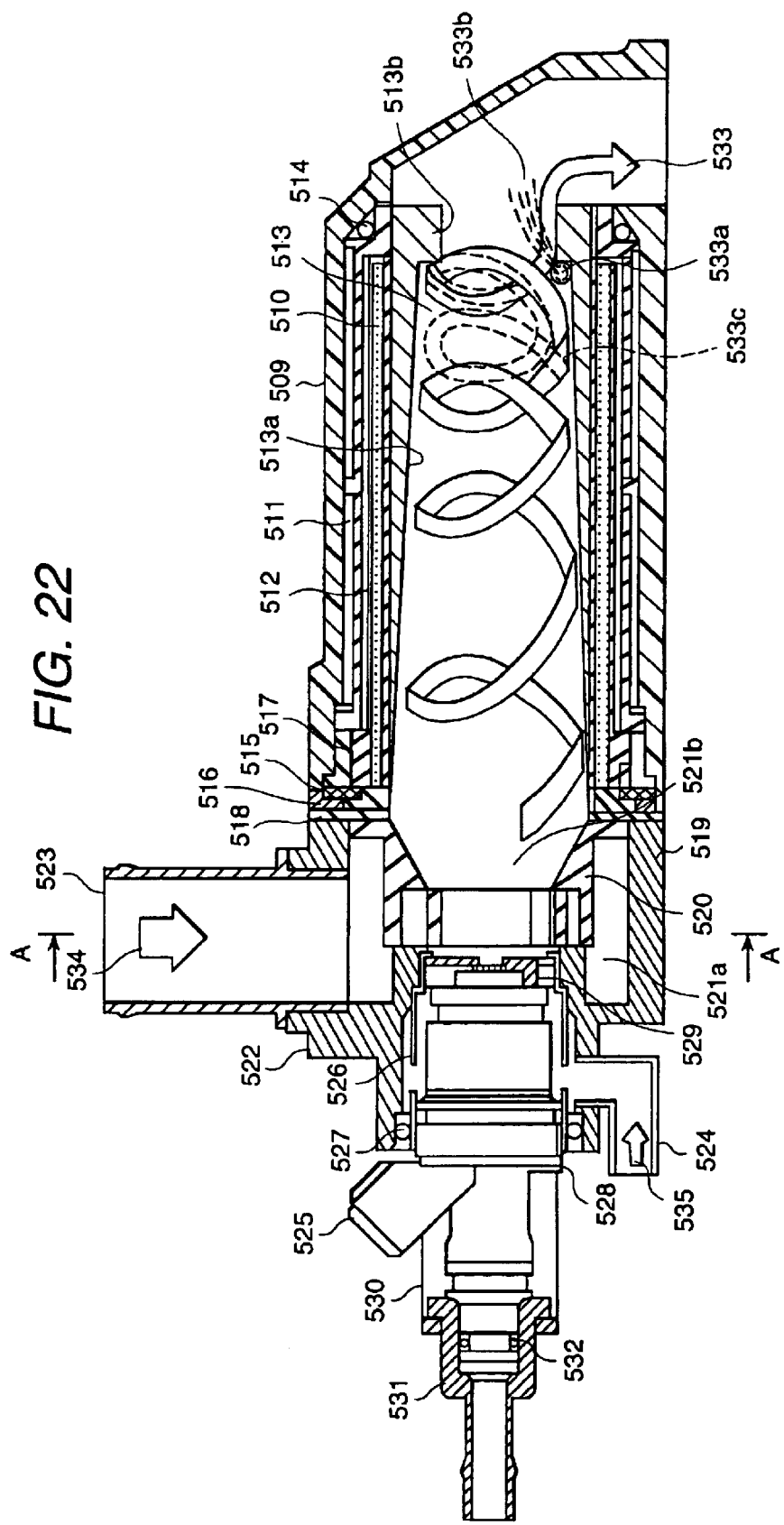
FIG. 22 is a longitudinal sectional view of the fuel carburetion accelerator according to an embodiment of the present invention.

Next, a further embodiment of the present invention will be described with reference to FIG. 22.

The main difference between this embodiment and the embodiment shown in FIG. 17 exists in the shape of the sub-channel. No further description of the other elements of the second embodiment is provided, since it is the same as the former embodiment in all other respects.

With this embodiment, the inner surface of sub-channel 513 takes a tapered shape so that the diameter of the inlet end is greater than that of the outlet end. The swirling force of the fuel brought into uniform swirling contact with the surface of sub-channel 513 by bypass air 34 and swirling nozzle vanes 520 can be maintained by adopting such a tapered shape. Without a taper, since the components that flow straight in a forward direction increase with an increase in channel length, the swirling force decreases at the outlet of the channel and the dwell time of the fuel is reduced. By tapering the inner surface of sub-channel 513 as shown in this embodiment, the dwell time of the fuel can be prolonged effectively and its carburetion can be achieved.

For this embodiment, in particular, a small-diameter stepped portion 513b protruding inward is provided at the outlet of the heater section. This stepped portion 513b captures uncarburized fuel 533a and either heats it by use of ceramic (PTC) heaters 510 or atomizes it by use of the air current generated by element 533b. Consequently, a fuel carburetion accelerator capable of responding to highly frequent carburetion can be obtained.

Also, for this embodiment, in which the mixture is swirled inside the heater section, the above-described stepped portion 513b incites reflection energy with respect to the swirling stream, and, as a result, the frequency of swirling of the mixture inside the heater section increases (see the dotted-line portion of element 533c). For this reason, the mixture is more likely to come into contact with the heater inner wall and can be carburized more easily.

The two effects described above can be obtained, even if the heater inner wall is not tapered towards the outlet end.

Embodiments of a fuel carburetion accelerator installation based on the present invention will be described below with reference to FIGS. 29 to 32.

Figure 29:
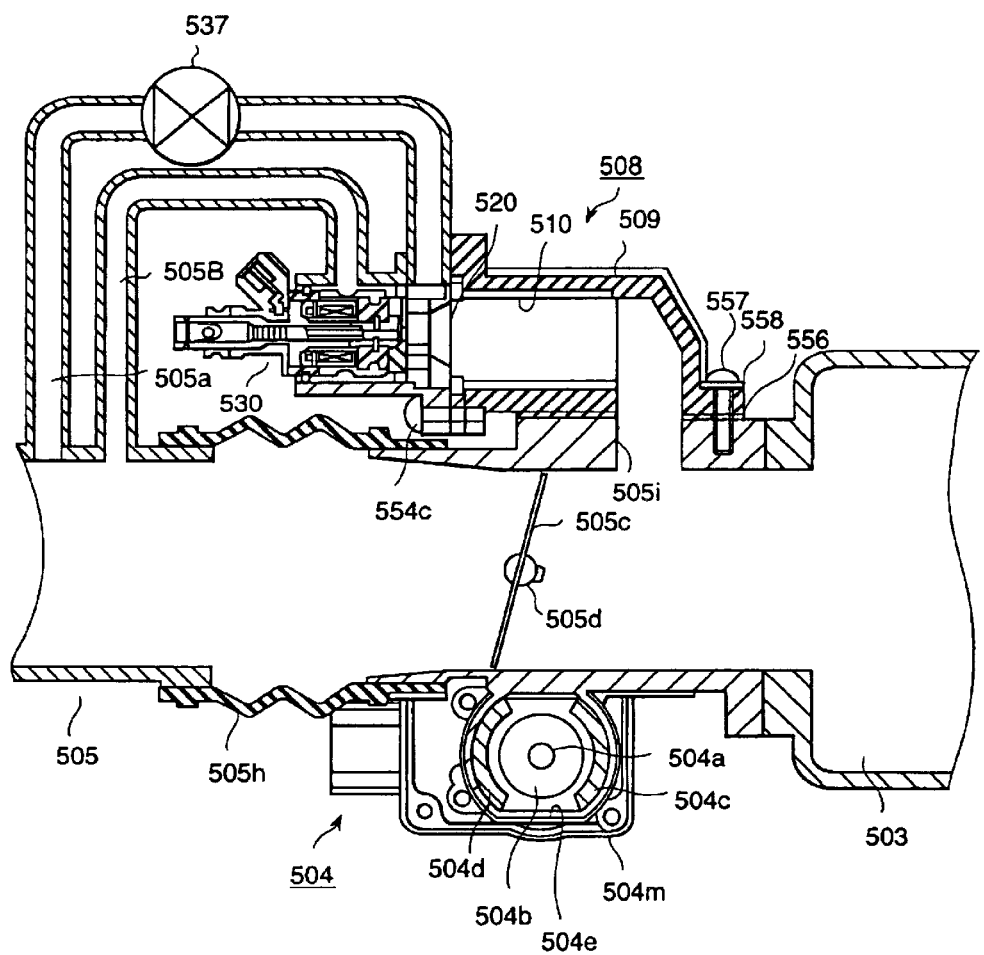
FIG. 29 is a longitudinal sectional diagram showing an embodiment of a fuel carburetion accelerator installation method.

FIG. 29 shows an embodiment of an installation on the electronically controlled throttle valve 504, wherein each clearance between fuel carburetion accelerator 508 and electronically controlled throttle valve 504 is sealed with a gasket 556, and the fuel carburetion accelerator and the electronically controlled throttle valve are fastened using a plurality of screws 557. By providing a minus electrode 558 on the outer resin body of the heater section, then wiring this electrode up to each screw 557, and fastening the wiring and the screw together, it is possible to electrically connect minus electrode 558, screw 557, and throttle body 505i, thereby eliminating the need for cables.

Figure 30:
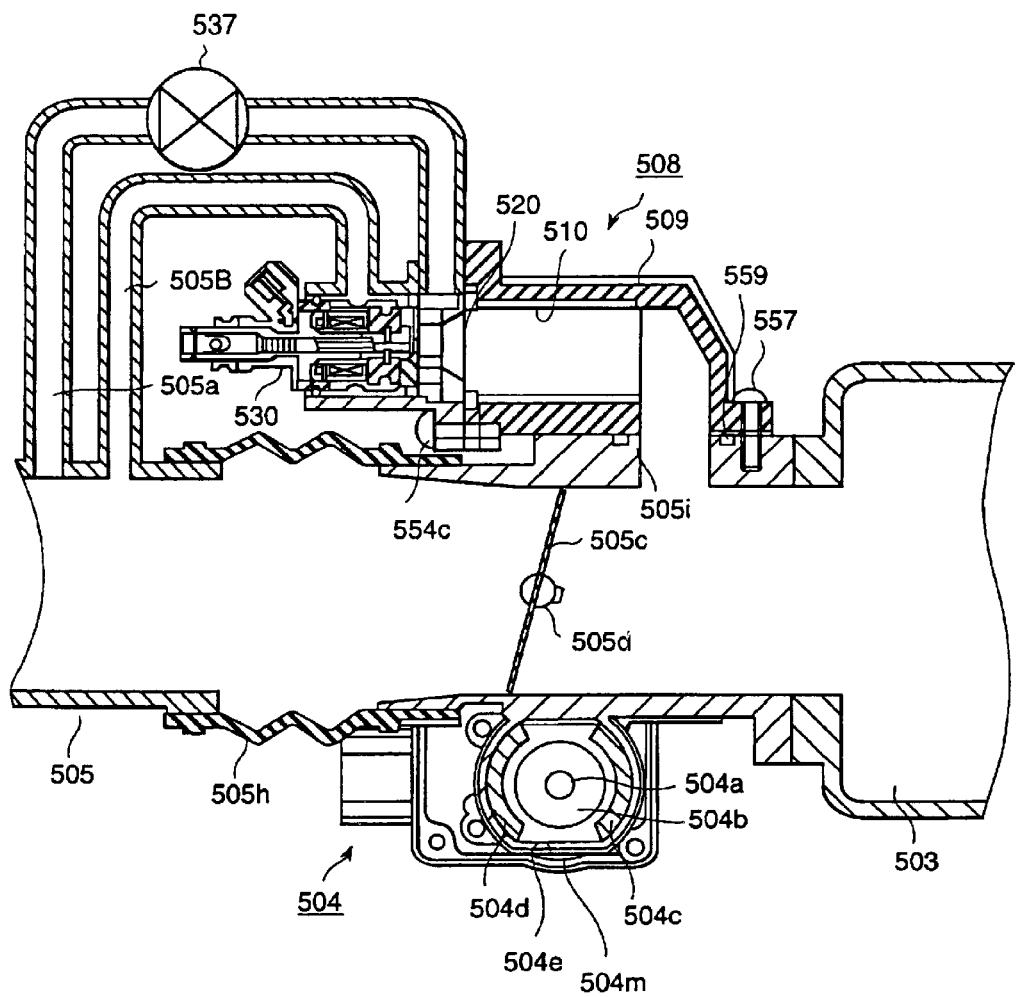
FIG. 30 is a longitudinal sectional diagram showing another embodiment of a fuel carburetion accelerator installation method.
Figure 31:
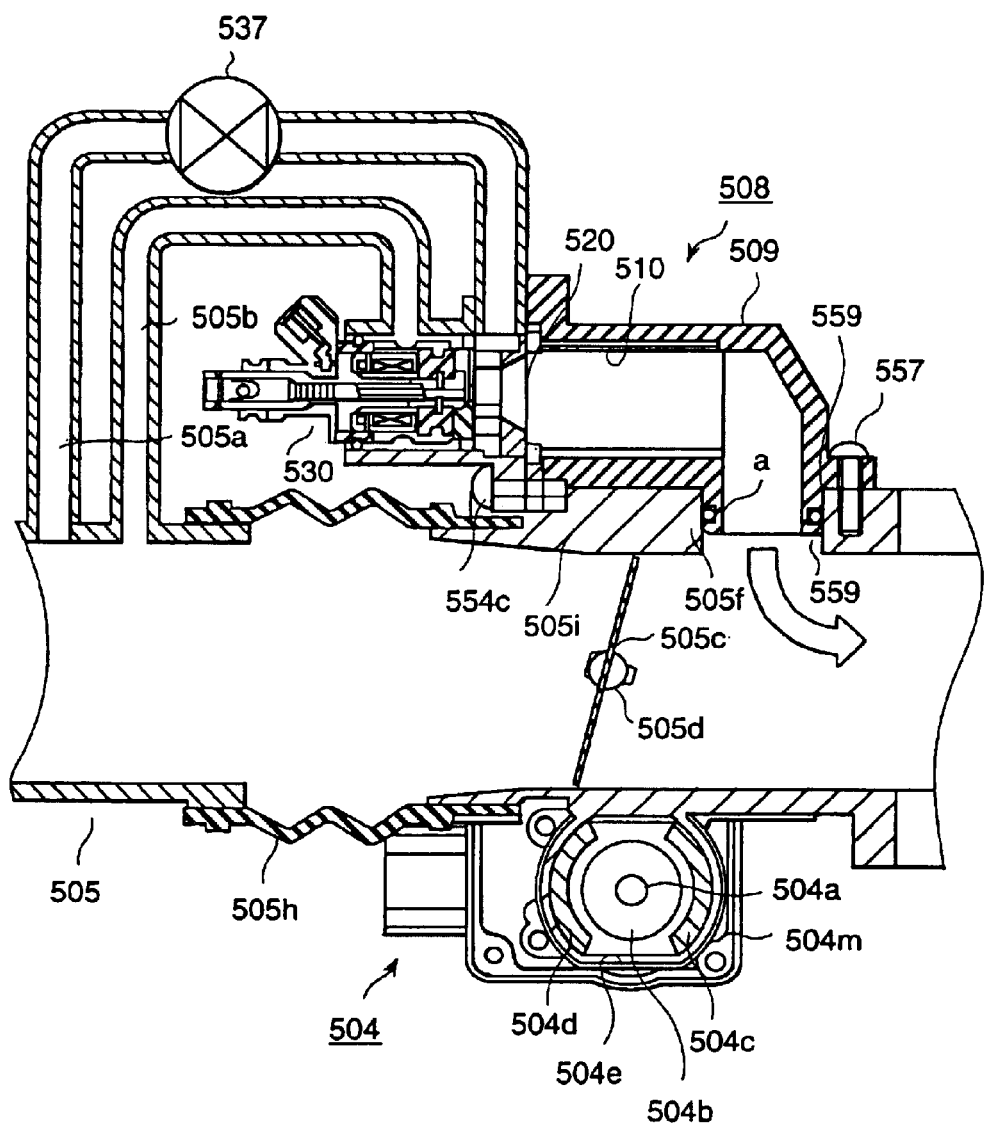
FIG. 31 is a longitudinal sectional diagram showing yet another embodiment of a fuel carburetion accelerator installation method.

FIGS. 30 and 31 show other embodiments of an installation on electronically controlled throttle valve 504, wherein each clearance between fuel carburetion accelerator 508 and electronically controlled throttle valve 504 are sealed with an O-ring 559 or a specially shaped ring. The configuration of FIG. 31, in particular, is such that the front end 509a of the discharge hole formed in heater element 509 can be inserted into the mixture introduction hole 505f formed in throttle body 505i, with the front end 509a functioning as the rotational lock for heater element 509 when it is fixed to throttle body 505i by use of screw 557. And, O-ring 559 or a specially shaped ring is mounted between front end 509a and the mixture introduction hole 505f.

Figure 32:
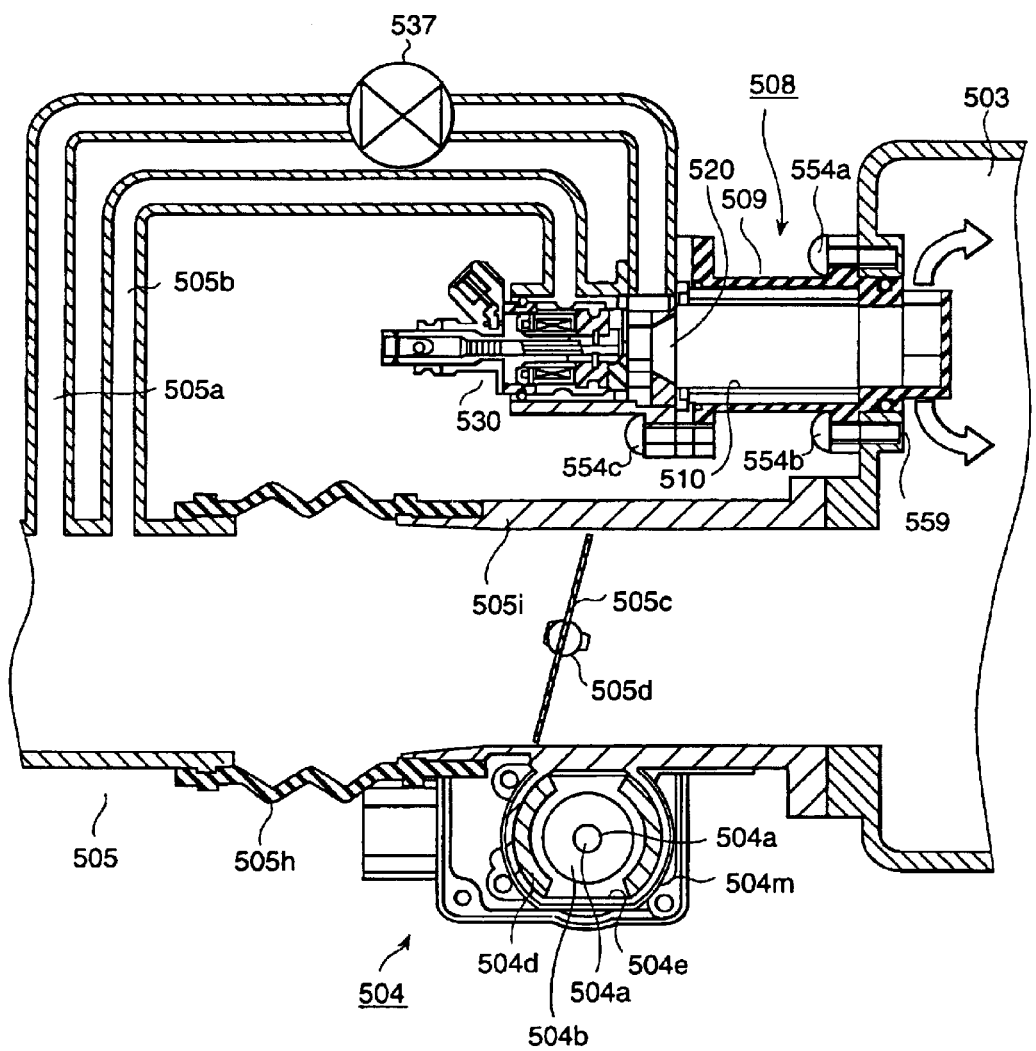
FIG. 32 is a longitudinal sectional diagram showing a further embodiment of a fuel carburetion accelerator installation method.

FIG. 32 shows a further embodiment of the installation of fuel carburetion accelerator 508 on suction air collecting pipe (surge tank) 503, wherein an opening for installing the fuel carburetion accelerator is formed near the installation positions of suction air collecting pipe (surge tank) 503 and electronically controlled throttle valve 504. The fuel carburetion accelerator is fixed to the wall surface of surge tank 503 by use of screws 554a and 554b. Numeral 559 denotes an O-ring or specially shaped ring provided between the fuel carburetion accelerator and the surge tank, and these rings provide sealing between the suction channel and the outside air.

According to this embodiment, it is possible to reduce the electrical energy consumed by the heater section and to accelerate the fuel carburetion. There is also the advantage that the mixture can be supplied directly to the surge tank without uncarburized fuel components sticking to the inner wall surface of the suction pipe located downstream of the throttle valve. In addition, channel simplification can be implemented by changing the channel at the outlet of the heater section. In other words, since the mixture at the outlet of fuel carburetion accelerator 508 can be discharged in direction of 360 degrees, flexibility can be assigned to the shape or mounting direction of the outlet. Resultingly, the installation efficiency can be improved. An example in which a plurality of mixture outlet ports are formed at the outlet of heater element 509 is shown in FIG. 32.

Furthermore, since fuel contact with the inside of the suction pipe is also reduced, it is possible to reduce the quantity of carburized fuel discharged to the atmosphere after the engine stops, and to suppress ignition caused by the occurrence of a backfire.

Although each embodiment described above uses a flow control valve 537 in the bypass air channel, provision of a bypass air channel in the electronically controlled throttle valve enables a similar effect to be obtained, even if the flow control valve is removed. In such a case, the amount of air flowing through the bypass air channel will be constant and engine speed control will be achieved by controlling the angle of the throttle valve by means of a motor. Consequently, even if the engine speed fluctuates, stable fuel carburetion characteristics can be obtained, since the amount of bypass air will not change.

Although the above-described embodiments use an electronically controlled (motor-driven) throttle valve, each embodiment can also be applied to a combination of a conventional throttle valve and an ISC valve, and a similar effect can be obtained in that case as well.

In FIGS. 29 to 31, it is preferable that in the case of the motor-driven throttle valve, since a reduction gear for transmitting torque is installed at the end portion of one side of the throttle shaft 505d, and, resultingly, since the lowest position of the channel under the fully closed status of the throttle valve 505c becomes the position facing the motor, the fuel carburetion accelerator 508 may be installed at the side facing the motor of the motor-driven throttle valve.

Since the lowest position of the channel under the fully closed status of the throttle valve 505c matches the maximum velocity position of the air current, provision of a hole immediately downstream with respect to this position, at the outlet of the fuel carburetion accelerator, enables a carburized mixture to easily join the main suction air. Therefore, the optimal position where the mixture outlet of the heater element 509 is to be connected to the main suction air channel, so as to join at the lowest position of the throttle valve, is the position that faces the motor.

Also, since the heater element 509 that forms sub-channel 513 requires a very large capacity, the heater element needs to have a very large dimension in its axial direction. For this reason, by installing the fuel carburetion accelerator 508 so that its longitudinal axial center is right-angled with respect to throttle shaft 505d, mounting the fuel injection valve 525 upstream at the throttle valve 505c of the main suction air channel 505, and mounting the heater element 509 along the main suction air channel 505 so that the heater element rests in the opening and closing area of the throttle valve 505c, it is possible to compactly construct the above-described apparatus, namely, the air/fuel feeder or the motor-driven throttle valve unit with the fuel carburetion accelerator.

Here, numeral 504a denotes the rotating shaft of the motor, numerals 504c and 504d denote magnets, numeral 504b denotes the rotor, and numeral 504e denotes the housing of the motor. As described above, by mounting the motor 504m immediately downstream at a position where the throttle valve 505c takes up the highest position at the upstream side when fully closed, motor 504m can be cooled by utilizing the adiabatic expansion of the air current, and, according to this configuration, an optimal structure in which the mixture from the fuel carburetion accelerator is to join the main suction air, and the structure for cooling the motor of the motor-driven throttle valve unit can be obtained simultaneously.

In the embodiment of FIG. 32 as well, both fuel carburetion accelerator 508 and electronically controlled throttle valve 504 can be mounted compactly on surge tank 3 by installing the fuel carburetion accelerator near the throttle valve unit as the electronically controlled throttle valve so that the longitudinal axial center of the fuel carburetion accelerator is parallel to the axial center of the main suction air channel 205.

In the embodiments of FIGS. 29 to 31, there is no need to perform large-scale matching operations after mounting the engine, since the characteristics of the motor-driven throttle valve unit and those of the fuel carburetion accelerator can be adjusted or tested under the combined status of both.

Figure 33:
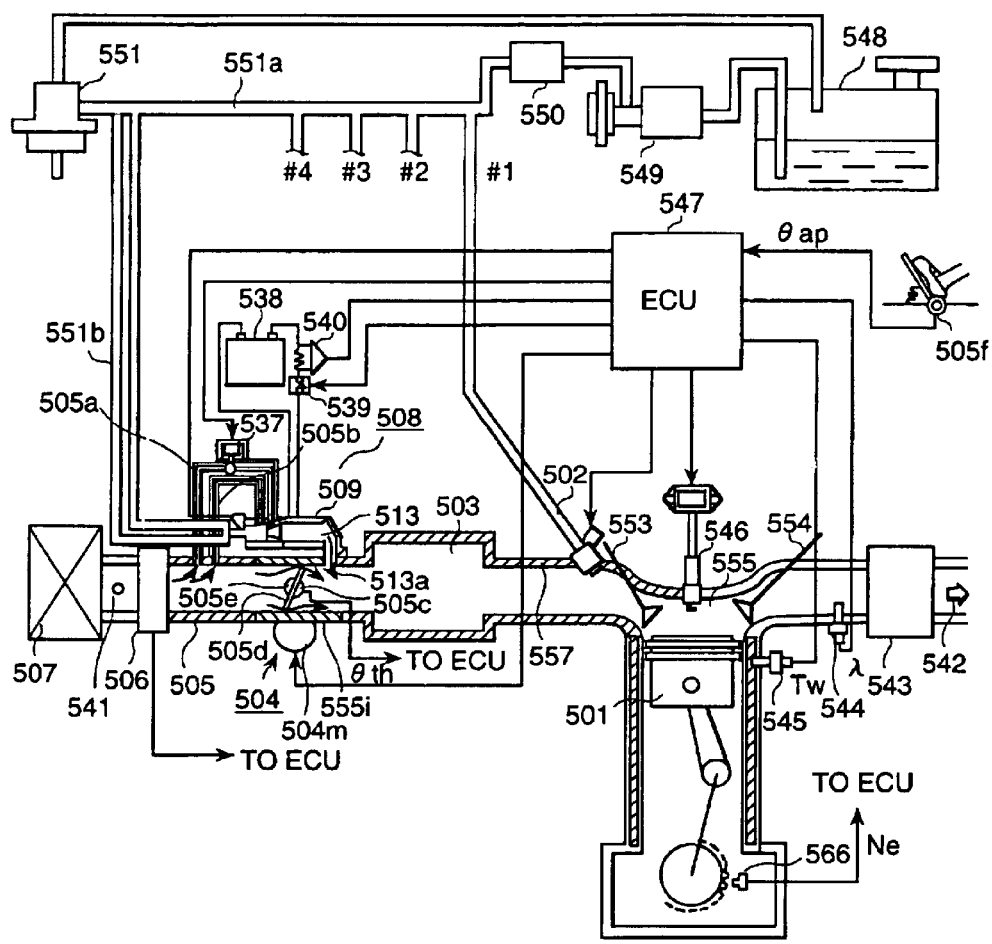
FIG. 33 is a longitudinal sectional diagram showing another system configuration of the present invention.
Figure 34:
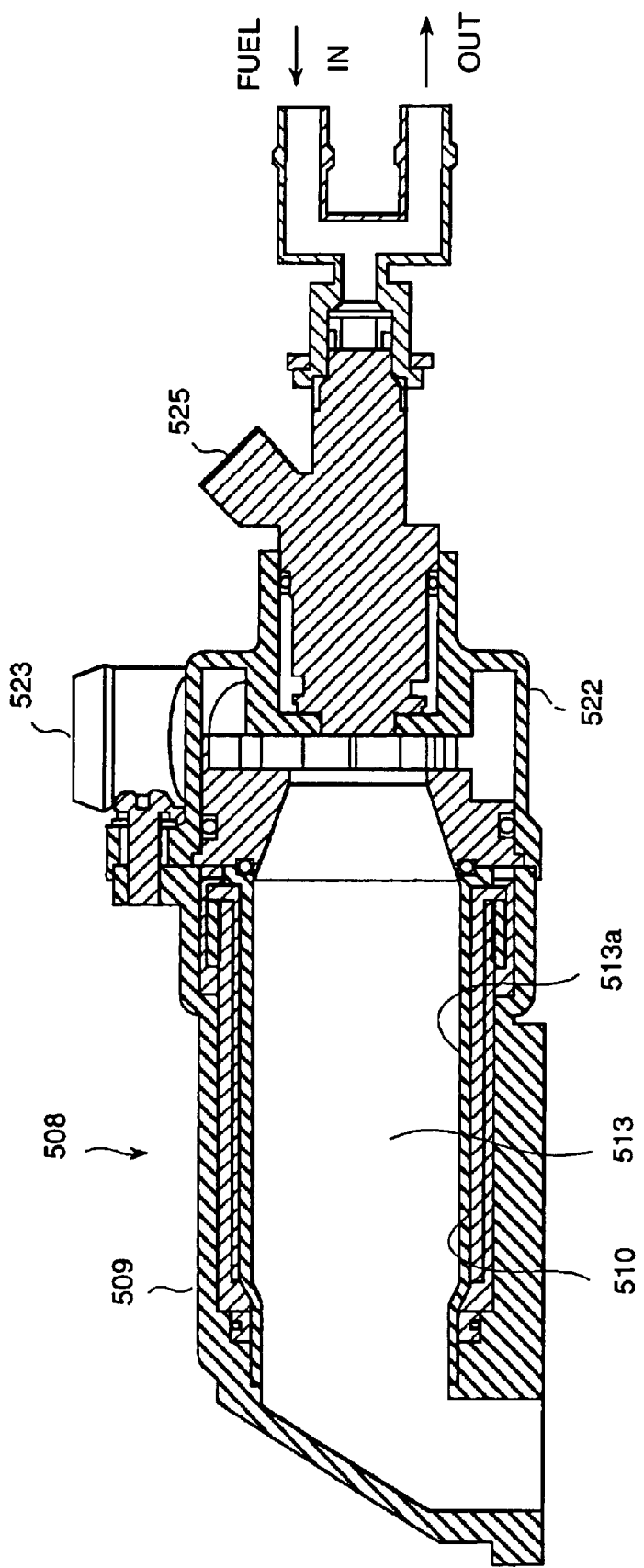
FIG. 34 is a partly enlarged longitudinal sectional view of the system shown in FIG. 33.

Another embodiment of the present invention is shown in FIGS. 33 and 34.

The embodiment relates to an improvement of the fuel pipeline through which the fuel is to be supplied to the fuel injection valve 525 of the fuel carburetion accelerator 508. The embodiment has a configuration where, in addition to the fuel injection valve 502 that injects fuel into the suction ports of the cylinders, another fuel injection valve 525, that is connected to fuel pipeline 551a, is employed, and heater element 509 is also employed as the element that carburizes the fuel injected from the fuel injection valve 525, wherein at least the fuel pipeline 551b extending to fuel injection valve 525 is connected in a return form.

In the embodiments that employ such a configuration, fuel flows from fuel pipeline 551a to fuel injection valve 525, whereas the fuel that has not been injected from fuel injection valve 525 is sent to a pressure regulator 551 through a return channel fuel pipeline 551b. At this time, the fuel that flows through the return channel fuel pipeline carries away fuel vapors from fuel injection valve 525, even if the vapors occur in the fuel injection valve. In this way, the fuel supply characteristics of fuel injection valve 525 can be prevented from being deteriorated by fuel vapors.

As set forth above, according to the present invention, since fuel contact with the heater section is averaged, fuel can be carburized even with small-size heaters and the heater design can be made compact.

When heaters of the same capacity are used, their carburetion ability can be improved by using the present invention, and, consequently, the quantity of HC gas emitted during engine warm-up can be minimized.

According to another feature of this invention, since the fuel carburetion accelerator can be mounted in an internal combustion engine by combining a motor-driven throttle valve unit and a suction air channel enclosure common thereto, the installation space required for the internal combustion engine can be minimized.

Also, the fuel injection characteristics of the fuel carburetion accelerator and the air flow control characteristics of the motor-driven throttle valve unit can be adjusted or inspected together under the combined status of both, and in that case, the characteristics of both can be adjusted or inspected easily.

According to yet another feature of this invention, since the fuel carburetion accelerator is constructed so as to be mountable on a surge tank, a discharged mixture can also be supplied to the cylinders without a delay. In addition, fuel can be prevented from coming into contact with the inner wall of the suction channel before it reaches the surge tank.

According to a further feature of this invention, even if vapors occur, they are carried away by the circulating fuel, and thus a fuel carburetion accelerator not significantly affected by vapors can be obtained.

According to a further feature of this invention, since the stepped portion at the outlet of the heater section captures uncarburized fuel components and either heats the components by use of ceramic (PTC) heaters or atomizes the components by use of an air current, a fuel carburetion accelerator capable of responding to highly frequent carburetion can be obtained.

Also, when this stepped portion is formed in a type of structure by which the mixture is to be swirled inside the heater section, the stepped portion incites reflection energy with respect to a swirling stream, and, as a result, the frequency of swirling of the mixture inside the heater section increases. For this reason, the mixture is more likely to come into contact with the heater inner wall and can be carburized more easily.

What is claimed is:

1. A fuel vaporization promoting apparatus for vaporizing fuel by causing fuel spray injected from a fuel injection valve to impact on a heat transfer unit provided on the downstream side of said fuel injection valve;

said fuel vaporization promoting apparatus being characterized in that the surface of said heat transfer unit has an irregular shape, wherein said irregular shape is formed of a groove provided on the surface of a cylindrical heat transfer unit, and the relationship of $d<(\sigma/(\rho \cdot g) \cdot (Ls/S)$ holds among d, $\sigma$, $\rho$, g, and Ls, where d denotes the inner diameter of a cylindrical heat transfer unit, $\sigma$ denotes a fuel surface tension, $\rho$ denotes density, g denotes gravity acceleration, Ls denotes length of contact between heat transfer unit surface and fuel, and S denotes cross section of fuel stored in said groove.

2. A fuel vaporization promoting apparatus according to claim 1 further characterized in that the surface of said heat transfer unit is provided with superhydrophilic treatment.

3. A fuel vaporization promoting apparatus according to claim 1 further characterized in that said fuel vaporization promoting apparatus comprises an intake manifold equipped with a throttle valve and a swirl air supply nozzle which causes swirl air to act on fuel spray injected from said fuel injection valve, and said heat transfer unit is arranged on the downstream side of said swirl nozzle, wherein a passage of said heat transfer unit on the downstream side is connected with the passage of said intake manifold on the downstream side.

4. A fuel vaporization promoting apparatus according to claim 3 further characterized in that an atomizer for promoting atomization of fuel spray injected from said fuel injection valve to said intake manifold on the downstream side of said throttle valve is provided on the upstream side of said swirl air supply nozzle.

5. A fuel vaporization promoting apparatus according to claim 1 wherein said groove runs substantially in an orthogonal line relative to the axial direction of said heat transfer unit.

6. A fuel vaporization promoting apparatus according to claim 1 wherein said groove is formed in substantially a straight line in the axial direction of said heat transfer unit.

7. A fuel vaporization promoting apparatus according to claim 1 wherein said groove comprises a lattice shaped groove.

* * * * *